(12) United States Patent
Park et al.

(10) Patent No.: US 9,401,229 B2
(45) Date of Patent: Jul. 26, 2016

(54) INSPECTION APPARATUS FOR PENETRATION PIPE OF NUCLEAR REACTOR HEAD

(71) Applicant: Korea Plant Service & Engineering Co., Ltd., Seongnam-si, Gyeonggi-do (KR)

(72) Inventors: Min Su Park, Seongnam-si (KR); Hong Seok Ryu, Yongin-si (KR); Youn Kyu Kim, Seoul (KR); Dong il Kim, Gyeonggi-do (KR); Bae Jun Kang, Yongin-si (KR); Joon Hong Kim, Yongin-si (KR); Won Taik Lim, Chungcheongbuk-do (KR); Sak Lee, Seoul (KR)

(73) Assignee: KOREA PLANT SERVICE & ENGINEERING CO., LTD, Seongnam (KR)

( * ) Notice: Subject to any disclaimer, the term of this patent is extended or adjusted under 35 U.S.C. 154(b) by 518 days.

(21) Appl. No.: 13/833,072

(22) Filed: Mar. 15, 2013

(65) Prior Publication Data

US 2014/0211902 A1 Jul. 31, 2014

(30) Foreign Application Priority Data

Jan. 31, 2013 (KR) .................. 10-2013-0011173

(51) Int. Cl.
*G21C 17/013* (2006.01)
*G21C 17/017* (2006.01)
*G21C 17/00* (2006.01)
*G21C 17/007* (2006.01)
*G21C 13/036* (2006.01)

(52) U.S. Cl.
CPC ............ *G21C 17/017* (2013.01); *G21C 17/002* (2013.01); *G21C 17/007* (2013.01); *G21C 13/036* (2013.01)

(58) Field of Classification Search
CPC combination set(s) only.
See application file for complete search history.

(56) References Cited

U.S. PATENT DOCUMENTS

| | | | |
|---|---|---|---|
| 5,596,612 A * | 1/1997 | Andersson | 376/245 |
| 2004/0131462 A1 * | 7/2004 | Hawkins et al. | 414/745.3 |

* cited by examiner

*Primary Examiner* — Sean P Burke
(74) *Attorney, Agent, or Firm* — Sughrue Mion, PLLC

(57) ABSTRACT

An inspection apparatus for a penetration pipe of a nuclear reactor head comprising: a body; a probe module installed at the body and having a probe which is inserted in the penetration pipe to inspect damage of the penetration pipe; a fixing module installed along a longitudinal direction of the body and having an expanding cylinder which is inserted in the penetration pipe to support an inner diameter of the penetration pipe; and a rotating module installed in the longitudinal direction of the body and having an expanding cylinder which is inserted in the penetration pipe to support the inner diameter of the penetration pipe.

42 Claims, 22 Drawing Sheets

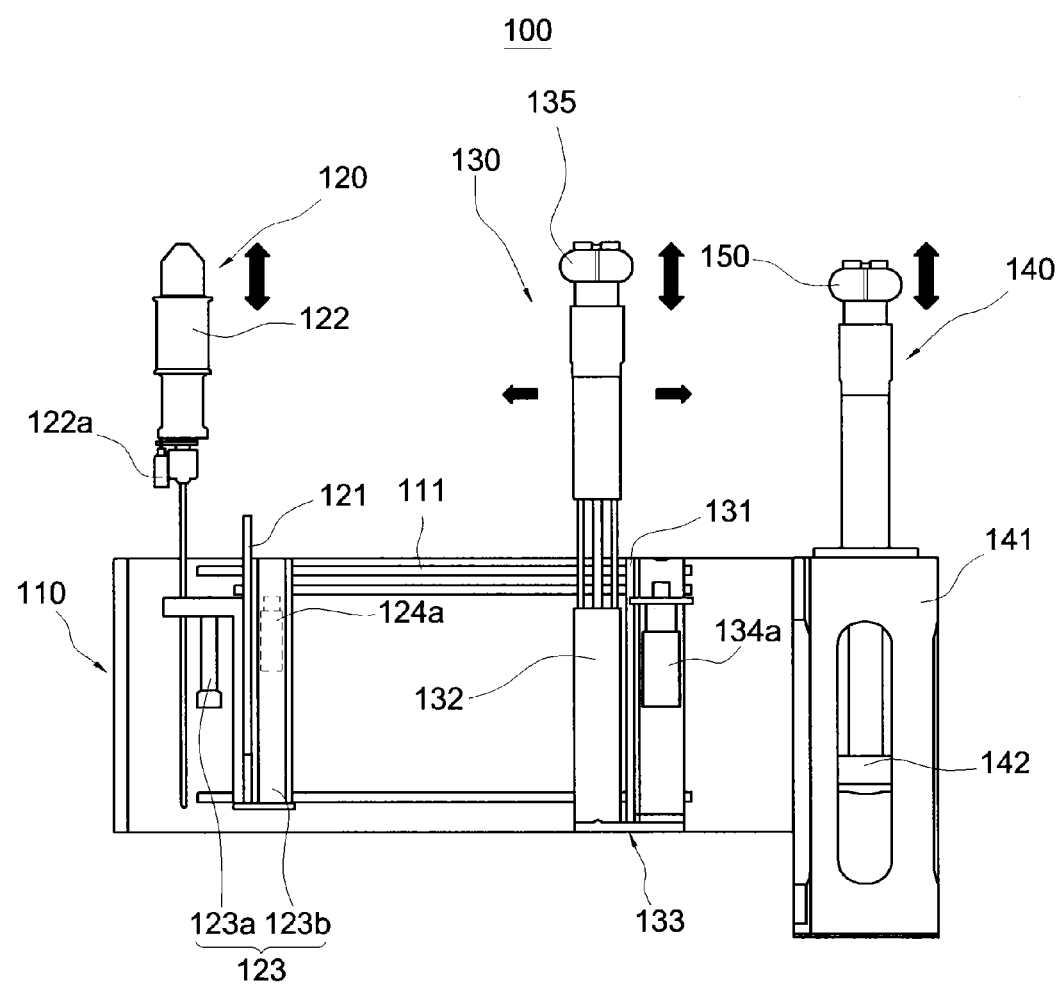

(a)

(b)

INSPECTION APPARATUS FOR PENETRATION PIPE OF NUCLEAR REACTOR HEAD

CROSS-REFERENCE TO RELATED APPLICATION

This application claims priority to and the benefit of Korean Patent Application No. 10-2013-0011173 filed in the Korean Intellectual Property Office on Jan. 31, 2013, the entire contents of which are incorporated herein by reference.

BACKGROUND

1. Field of the Disclosure

The present disclosure relates to an inspection apparatus for a nuclear reactor, and more particularly, to an inspection apparatus for a penetration pipe of a head which remotely inspects the penetration pipe while being attached to the penetration pipe of the nuclear reactor head in order to evaluate soundness of the nuclear reactor head and the penetration pipe in the high radiation region of a nuclear power plant.

2. Discussion of the Background Art

In a nuclear reactor head, because sealing performance needs to be maintained in an operation state of high temperature and high pressure, durability and soundness are very important. However, in recent years, as leakage due to defects of welded portions occurs at a penetration pipe P of the nuclear reactor head H, periodical nondestructive inspection is performed.

In most of the apparatuses that are being used at present, the inspection is performed using a robot installed at the lower portion in a state in which the head is seated on a seat table.

Referring to FIGS. 18 and 19, when the penetration pipe P of the nuclear reactor head H is inspected, an inspection apparatus is required to inspect an annular space of about 3 to 5 m, after being moved at a distance of about 3 to 5 m, which is a distance from a floor to the penetration pipe P, by using a manipulator or a transfer device. Accordingly, most of the inspection apparatuses, which are applied at present, are huge, and installation, movement, and management of the inspection apparatus are difficult.

In addition, in a case of a probe which is used to inspect soundness of the penetration pipe P, because an excessive ascending operation of the probe from a floor to the penetration pipe is needed to insert the probe into the penetration pipe, there is a considerable difficulty in inserting the probe into the penetration pipe P due to the vibration of the probe.

Moreover, when another penetration pipe P is inspected after one penetration pipe P is inspected, the movement of the apparatus, an operation of adjusting a center of the penetration pipe P and a position of the probe, and ascending and descending operations of the probe require an inordinate amount of time, and therefore an inspection for the head H of the nuclear generator is delayed and an operation of the nuclear generator is delayed. Accordingly, the inspection apparatus of the related art is very ineffective in time and economy.

Therefore, an inspection apparatus is required to solve the above-mentioned problems and efficiently inspect a penetration pipe P formed at a head H of a nuclear generator.

SUMMARY OF THE DISCLOSURE

The present disclosure has been made in an effort to provide an inspection apparatus for a penetration pipe of a nuclear reactor head, capable of facilitating installation, movement and an inspection operation of the inspection apparatus by remotely and automatically inspecting soundness of the penetration pipe while fixing and moving the inspection apparatus through the penetration pipe of the nuclear reactor head.

In addition, the present disclosure provides a method of inspecting a penetration pipe of a nuclear reactor head, capable of easily performing the inspection of all of the penetration pipes of the nuclear reactor head by using the inspection apparatus for the penetration pipe of the nuclear reactor head, which is fixed and moved through the penetration pipe of the nuclear reactor head, and minimizing a transfer distance of the inspection apparatus and a probe when the inspection is performed.

A first exemplary embodiment of the present disclosure provides an inspection apparatus for a penetration pipe formed at a nuclear reactor head, including: a body; a probe module installed at the body and having a probe which is inserted in the penetration pipe to inspect damage of the penetration pipe; a fixing module installed along a longitudinal direction of the body and having an expanding cylinder which is inserted in the penetration pipe to support an inner diameter of the penetration pipe; and a rotating module installed along the longitudinal direction of the body and having an expanding cylinder which is inserted in the penetration pipe to support the inner diameter of the penetration pipe.

A second exemplary embodiment of the present disclosure provides an inspection apparatus for a penetration pipe formed at a nuclear reactor head, including: a body; a probe module installed at the body and having a probe which is inserted in the penetration pipe to inspect damage of the penetration pipe; a fixing module installed along a longitudinal direction of the body and having an expanding cylinder which is inserted in the penetration pipe to support an inner diameter of the penetration pipe; and a rotating module installed along the longitudinal direction of the body and having an outer diameter support gripper configured to support an outer diameter of the penetration pipe.

A third exemplary embodiment of the present disclosure provides an inspection apparatus for a penetration pipe formed at a nuclear reactor head, including: a body; a probe module installed at the body and having a probe which is inserted in the penetration pipe to inspect damage of the penetration pipe; a fixing module installed along a longitudinal direction of the body and having an expanding cylinder which is inserted in the penetration pipe to support an inner diameter of the penetration pipe; and a rotating module installed along the longitudinal direction of the body and having a cone support rotating gripper configured to support an outer diameter of a cone of the penetration pipe.

A fourth exemplary embodiment of the present disclosure provides an inspection apparatus for a penetration pipe formed at a nuclear reactor head, including: a body; a probe module installed at the body and having a probe which is inserted in the penetration pipe to inspect damage of the penetration pipe; a fixing module installed along a longitudinal direction of the body and having a cone support rotating gripper configured to support an outer diameter of a cone of the penetration pipe; and a rotating module installed along the longitudinal direction of the body and having a cone support rotating gripper configured to support the outer diameter of the cone of the penetration pipe.

A fifth exemplary embodiment of the present disclosure provides an inspection apparatus for a penetration pipe formed at a nuclear reactor head, including: a body; a probe module installed at the body and having a probe which is inserted in the penetration pipe to inspect damage of the penetration pipe; a fixing module installed on the same line as the probe module along a longitudinal direction of the body and having a cone support gripper configured to support an outer diameter of the penetration pipe and or an outer diameter of a cone; and a rotating module installed along the longitudinal direction of the body and having a cone support gripper configured to support the outer diameter of the penetration pipe or the outer diameter of the cone.

A sixth exemplary embodiment of the present disclosure provides a method of inspecting a penetration pipe of a nuclear reactor head using the inspection apparatus for a penetration pipe of a nuclear reactor head, the method including: an initial inspection step of inspecting an initial penetration pipe through a probe module after fixing the probe module to the penetration pipe through the fixing module and the rotating module; a linear movement step of linearly moving a body through the fixing module after releasing the fixing by the rotating module; a fixing step of fixing again the probe module to the penetration pipe using the fixing module and the rotating module; and an inspection step of inspecting another penetration pipe using the probe module.

A seventh exemplary embodiment of the present disclosure provides a method of inspecting a penetration pipe of a nuclear reactor head using the inspection apparatus for a penetration pipe of a nuclear reactor head, the method including: an initial inspection step of inspecting an initial penetration pipe through a probe module after fixing the probe module to the penetration pipe through the fixing module and the rotating module; a rotational movement step of rotating the body through the rotating module after releasing the fixation by the fixing module; a fixing step of fixing again the probe module to the penetration pipe using the fixing module and the rotating module; and an inspection step of inspecting another penetration pipe to be inspected using the probe module.

The inspection apparatus according to the exemplary embodiments of the present disclosure may be applicable regardless of nuclear reactor models (Westinghouse, OPR 1000, APR1400, or the like) because the inspection apparatus fixes and supports the inner and outer diameters of the head penetration pipe and the outer diameter of the cone and is moved based on the fixed position.

In addition, because in the inspection apparatus of the present disclosure, the movement and the inspection are performed in a state in which the penetration pipe of the nuclear reactor head is supported, the movement time and the inspection time may be reduced compared to the apparatus of the related art which moves the inspection apparatus on the floor.

In addition, in the inspection apparatus according to the present disclosure, because the support and the reference are set based on the penetration pipe that is an object for the inspection, the inspection apparatus may easily access a portion for inspection at the time of inspection, and thereby the inspection time may be reduced.

Moreover, the inspection apparatus of the present disclosure has a small size, and therefore the movement, the installation, and the storage of the inspection apparatus may be easy.

BRIEF DESCRIPTION OF THE DRAWINGS

FIGS. 4A to 4C are operational views schematically illustrating raising operations of a probe module, a fixing module, and a rotating module of the inspection apparatus for a penetration pipe of a nuclear reactor head of FIG. 1.

DETAILED DESCRIPTION OF THE PREFERRED EMBODIMENTS

Figure 1:
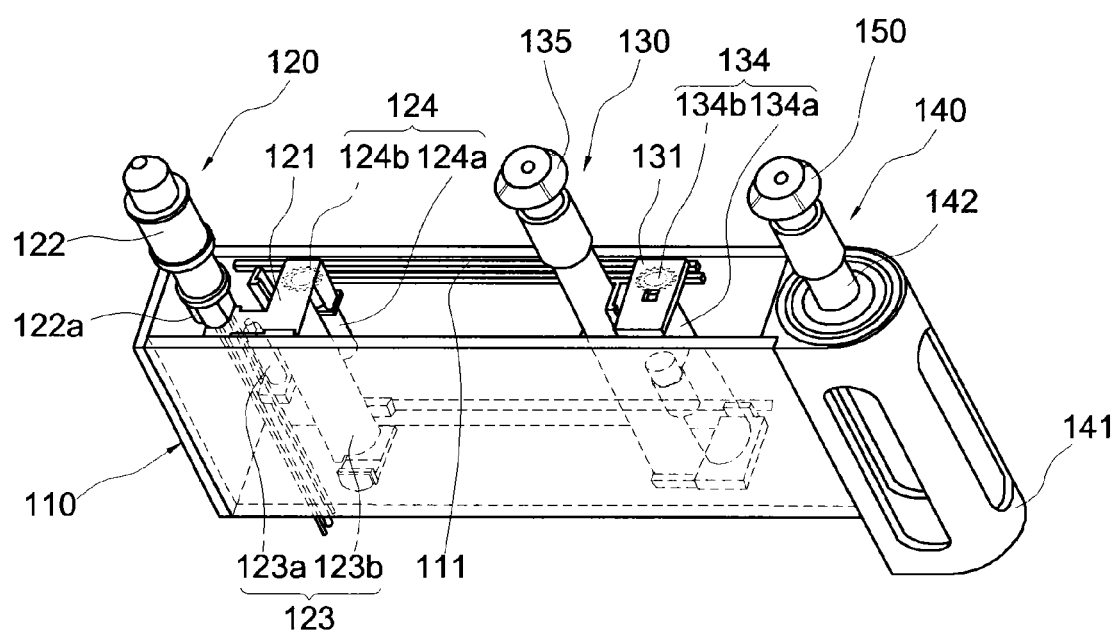
FIG. 1 is a perspective view illustrating an inspection apparatus for a penetration pipe of a nuclear reactor head according to a first exemplary embodiment of the present disclosure.

Hereinafter, exemplary embodiments of the present disclosure will be described in detail with reference to the accompanying drawings.

First of all, we should note that in giving reference numerals to elements of each drawing, like reference numerals refer to like elements even though like elements are shown in different drawings. In describing the present disclosure, specific descriptions regarding known configurations or functions, which may obscure the gist of the present disclosure, will not be described in detail.

Figure 2:
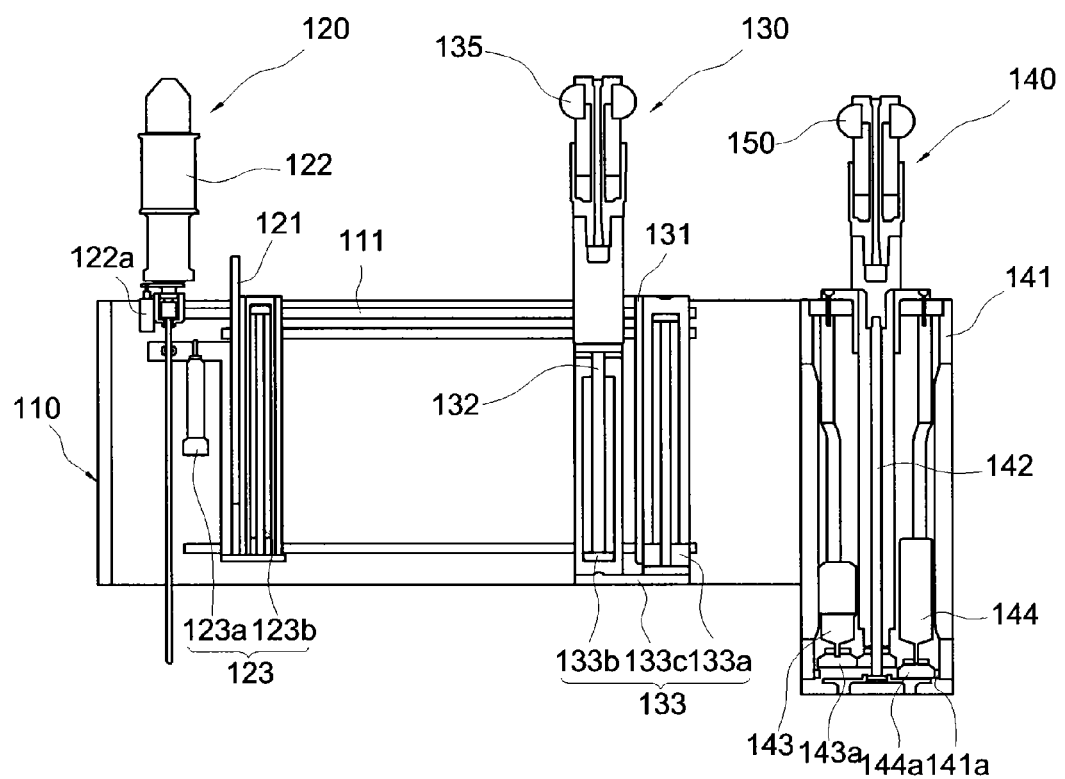
FIG. 2 is a front view illustrating the inspection apparatus for a penetration pipe of a nuclear reactor head according to the first exemplary embodiment of the present disclosure.
Figure 3:
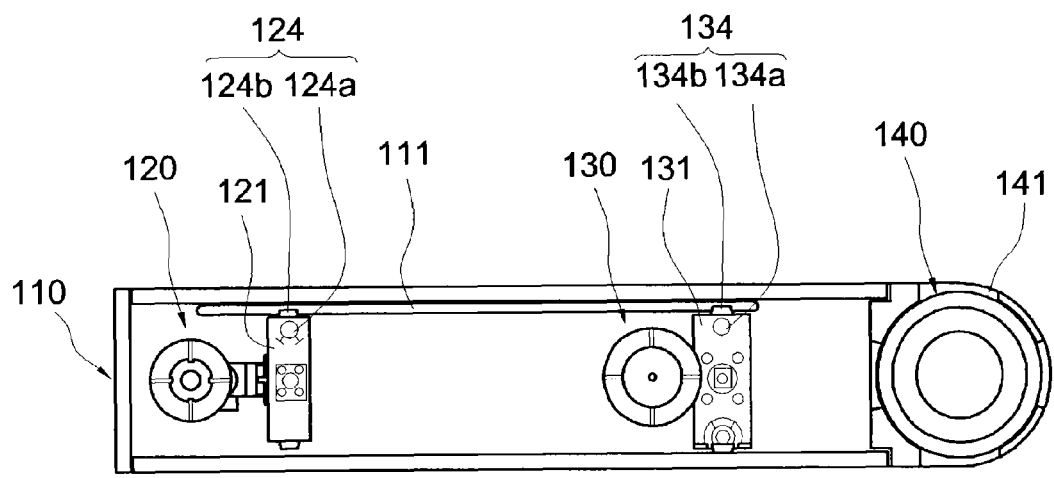
FIG. 3 is a top view illustrating the inspection apparatus for a penetration pipe of a nuclear reactor head according to the first exemplary embodiment of the present disclosure.
Figure 4A:
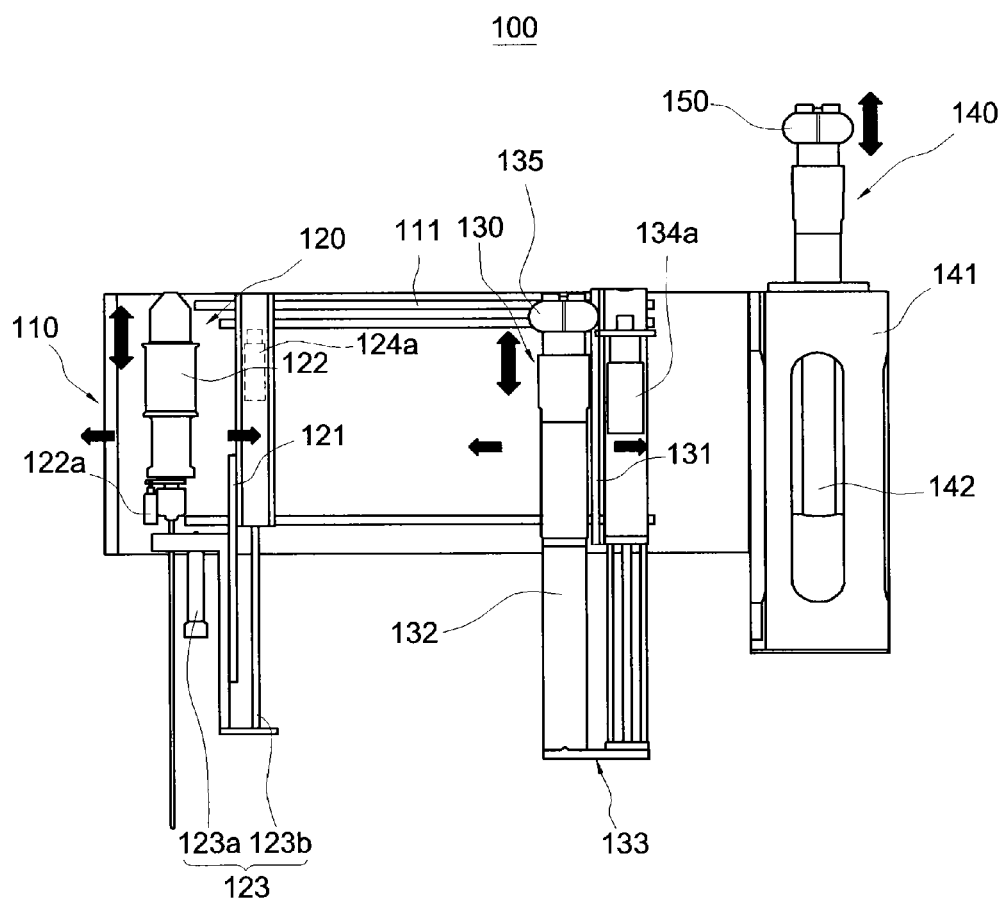
Figure 4B:
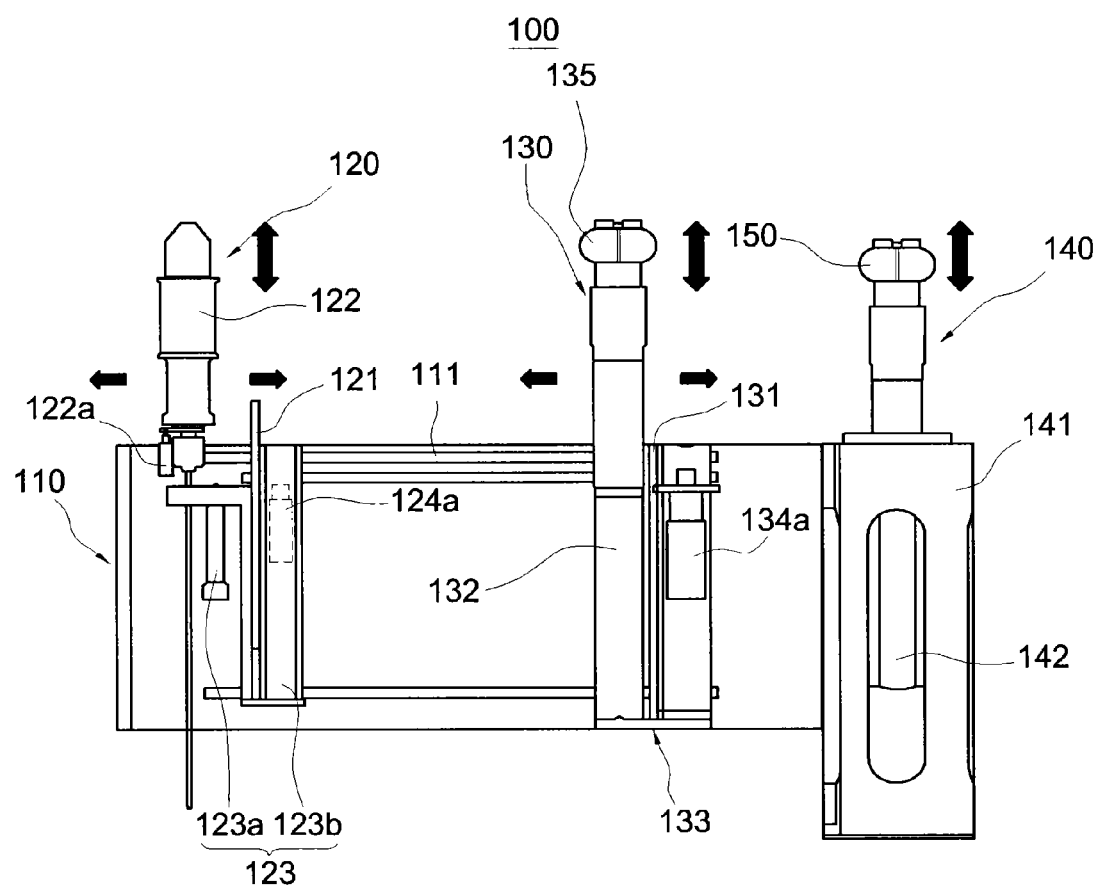

FIG. 1 is a perspective view illustrating an inspection apparatus 100 for a penetration pipe of a nuclear reactor head according to a first exemplary embodiment of the present disclosure. FIG. 2 is a front view illustrating the inspection apparatus 100 for a penetration pipe of a nuclear reactor head according to the first exemplary embodiment of the present disclosure. FIG. 3 is a top view illustrating the inspection apparatus 100 for a penetration pipe of a nuclear reactor head according to the first exemplary embodiment of the present disclosure. FIGS. 4A to 4C are operational views schematically illustrating raising operations of a probe module 120, a fixing module 130, and a rotating module 140 of the inspection apparatus 100 for a penetration pipe of a nuclear reactor head of FIG. 1.

Referring to FIG. 1 to FIG. 4C, the inspection apparatus 100 for a penetration pipe of a nuclear reactor head according to the first exemplary embodiment of the present disclosure, includes a body 110, and a probe module 120, a fixing module 130, and a rotating module 140, which are installed in a longitudinal direction of the body 110.

The body 110 may include a housing which has an internal space and extends in a longitudinal direction. The housing has both lateral sides which are opposite to each other and are formed to be partially opened so that the probe module 120, the fixing module 130, and the rotating module 140 may be coupled thereto.

In addition, the housing may include a guide rail unit 111 for guiding movements of the probe module 120 and the fixing module 130. Here, the guide rail unit 111 may be a rail having a structure in which saw teeth are formed, or a rail having a screw structure.

The probe module 120 refers to a configuration which is drawn into a penetration pipe P of a nuclear reactor in order to measure soundness of the penetration pipe P, and may include a probe fixing frame 121, a probe 122 mounted at the probe fixing frame 121, a probe lifting unit 123 for lifting up and down the probe 122, and a probe moving unit 124 for moving the probe 122 along the body 110.

The probe P refers to a detection device for a measurement target without changing a state of the object for the measurement target, and may be fixed to one side of the probe fixing frame 121 as a needle electrode for measurement. In addition, a probe rotating motor 122a for rotating the probe 122 may be provided at one side of the probe 122. Here, the rotating motor 122a may rotate the probe 122 when the probe 122 is inserted into the penetration pipe P to inspect the penetration pipe P.

The probe lifting unit 123 refers to a configuration which is provided at the probe fixing frame 121 in order to lift up and down the probe 122, and may include a motor and a cylinder. Here, a plurality of motors and a plurality of cylinders may be provided, and a combination of the motor and the cylinder may be provided. Hereinafter, an example in which the motor and the cylinder are combined to lift up and down the probe will be described.

The probe lifting unit 123 may include a first cylinder 123b for lifting up and down the probe 122 in a first stage, and a first motor 123a for lifting up and down the probe 122 in a second stage (here, the lifting up and down operations according to a lifting unit which will be described below and includes the probe lifting unit 123 do not refer to the lifting up and down operations that are apparently and simply classified into the first stage and the second stage, and the expression of the first stage and the second stage is used for explanatory convenience as a plurality of configurations for performing the lifting up and down operations is provided).

The first cylinder 123b may be operated so that the probe 122 is drawn from an inside of the body 110 to an outside of the body 110 and drawn into the inside of the body 110 (lifting up and down operation in the first stage). In addition, the first motor 123a may be operated so that the probe 122 drawn out by the first cylinder 123b is more drawn out of the body 110 (lifting up operation in the second stage).

The probe moving unit 124 may include a probe moving motor 124a provided with a gear 124b or a ball screw and square threads, which are operated together with the guide rail unit 111. Specifically, in a case in which the guide rail unit 511 has a saw tooth structure, the probe moving motor 124a may be provided with the gear 124b, and in a case in which the guide rail unit 111 has a screw structure, the probe moving motor may be provided with the ball screw and the square threads. Therefore, the probe module 120 may be moved along the body 510 by a forward/reverse operation of the probe moving motor 124a.

Hereinafter, regarding the guide rail unit and the probe moving unit, an example in which the guide rail unit is formed in the saw tooth structure, and the moving motor is provided with the gear will be described with reference to the drawings for understanding of the disclosure and explanatory convenience.

Regarding the cooperation between the probe moving motor 124a and the guide rail unit 111, by the structure in which the gear 124b is formed at the probe moving motor 124a, the guide rail unit 111 has the saw teeth, and the gear 124a and the saw teeth are engaged with each other, the probe moving motor 124a and the guide rail unit 111 may be operated together.

The fixing module 130 is provided at the body 110 in order to fix the body 110 to the penetration pipe P, and may include a fixing shaft fixing frame 131, a fixing shaft 132, a fixing shaft lifting unit 133 for lifting up and down the fixing shaft 132, and a fixing shaft moving unit 134 for moving the fixing shaft 132 along a longitudinal direction of the body 110.

The fixing shaft 132 may include an expanding cylinder 135 which is formed at an end of the fixing shaft 132 and formed with a plurality of separated fingers. The expanding cylinder 135 may be fixed to an inner diameter of the penetration pipe P as the expanding cylinder 135 is inserted in the penetration pipe p to expand the fingers, and the expanding cylinder 135 may be released as the fingers contract. Here, the expanding cylinder 135 may be operated by a supply of working fluid by pneumatic pressure or hydraulic pressure, and may be expanded and contracted as an expanding portion pipe is drawn into or out of an inside of the finger.

The fixing shaft lifting unit 133 refers to a configuration for lifting up and down the fixing shaft 132, and may include a motor and a cylinder. Here, a plurality of motors and a plurality of cylinders may be provided, and a combination of the motor and the cylinder may be provided. Hereinafter, an example in which a plurality of cylinders is combined to lift up and down the fixing shaft will be described.

The fixing shaft lifting unit 133 may include a second cylinder 133a which is coupled to the fixing shaft fixing frame 131 to lift up and down the fixing shaft 132 in the first stage. Here, the second cylinder 133a may be operated so that the fixing shaft 132 is drawn from the inside of the body 110 to the outside of the body 110 and drawn into the inside of the body 110 (lifting up and down operation in the first stage). In addition, the fixing shaft lifting unit 133 may include a third cylinder 133b which has the one end, which is connected to the second cylinder 133a through a connection frame 133c, and lifts up and down the fixing shaft 132 in the second stage. Here, the third cylinder 133b may be operated so that the fixing shaft 132 drawn out by the second cylinder 133a is more drawn out of the body 110 (lifting up operation in the second stage).

The fixing shaft moving unit 134 may include a fixing shaft moving motor 134a which is formed at the fixing shaft fixing frame 131, and moves the fixing shaft 132 along the body 110 while being operated together with the guide rail unit 111. Here, the configuration of the fixing shaft moving unit 134 including the fixing shaft moving motor 134a and the cooperation with the guide rail unit 111 may be similar or identical to those of the aforementioned probe moving unit 124.

The rotating module 140 may include a rotating shaft housing 141 integrally formed with the body 110, a rotating shaft 142 received inside the rotating shaft housing 141, a second motor 143 for lifting up and down the rotating shaft 142, and a body rotating motor 144 for rotating the body 110 about the rotating shaft 141.

The rotating shaft housing 141 is a member which has a cylindrical structure, and has a receiving space for receiving therein the second motor 143 and the body rotating motor 144, and an upper side of the rotating shaft housing 141 is partially opened so that the rotating shaft 142 is lifted up and down. In addition, saw teeth 141a may be formed at a lower end portion of the rotating shaft housing 141 along an inner circumferential surface so as to be operated together with the body rotating motor 144 in the same driving manner as in an inner gear structure.

The rotating shaft 142 serves as a rotating center axis for rotating the body 110, and an expanding cylinder 150, which is similar or identical to the expanding cylinder 135 formed at the end of the fixing shaft 132, may be provided at an end of the rotating shaft 142. Accordingly, the rotating shaft 142 is inserted into the penetration pipe P by the expanding cylinder 150 to be fixed to the inner diameter of the penetration pipe P.

The second motor 143 is provided inside the rotating shaft housing 141, and includes a gear 143a, which is operated together with the rotating shaft 142, to lift up and down the rotating shaft 142 by a forward/reverse operation of the second motor 143.

The body rotating motor 144 is provided inside the rotating shaft housing 141, and is operated together with the rotating shaft 142 to rotate the body 110 in a left or right direction (a clockwise or counter clockwise direction) by a forward/reverse operation of the body rotating motor 144. Here, a gear 144a is formed at the fixing shaft rotating motor 144, and is operated together with the saw teeth 141a, which are formed at an inner side of the lower end of the rotating shaft housing 141 as described above, in the same driving manner as in an inner gear structure.

In addition, the inspection apparatus 100 for the penetration pipe of the nuclear reactor head according to the first exemplary embodiment of the present disclosure may include a sensor (not illustrated) and a camera (not illustrated) in order to improve precision of a position and a movement of each module. The sensor may include a distance measurement sensor and a position sensor. In a case of the distance measurement sensor, distance data between the penetration pipe P and the probe module 120, the fixing module 130, and the rotating module 140 may be applied to a control operation. In addition, in a case of the position sensor, the position sensor may be formed at any one of the body 110 and the modules 120, 130, and 140 to detect a position of the inspection apparatus in the nuclear reactor head.

Moreover, the camera is formed at any one of the body 110 or the modules 120, 130, and 140, and therefore an operator may check the inside of the nuclear reactor head or the penetration pipe P with naked eyes.

Hereinafter, a movement and inspection method of the inspection apparatus 100 for a penetration pipe of a nuclear reactor head according to the first exemplary embodiment of the present disclosure will be described.

Figure 18:
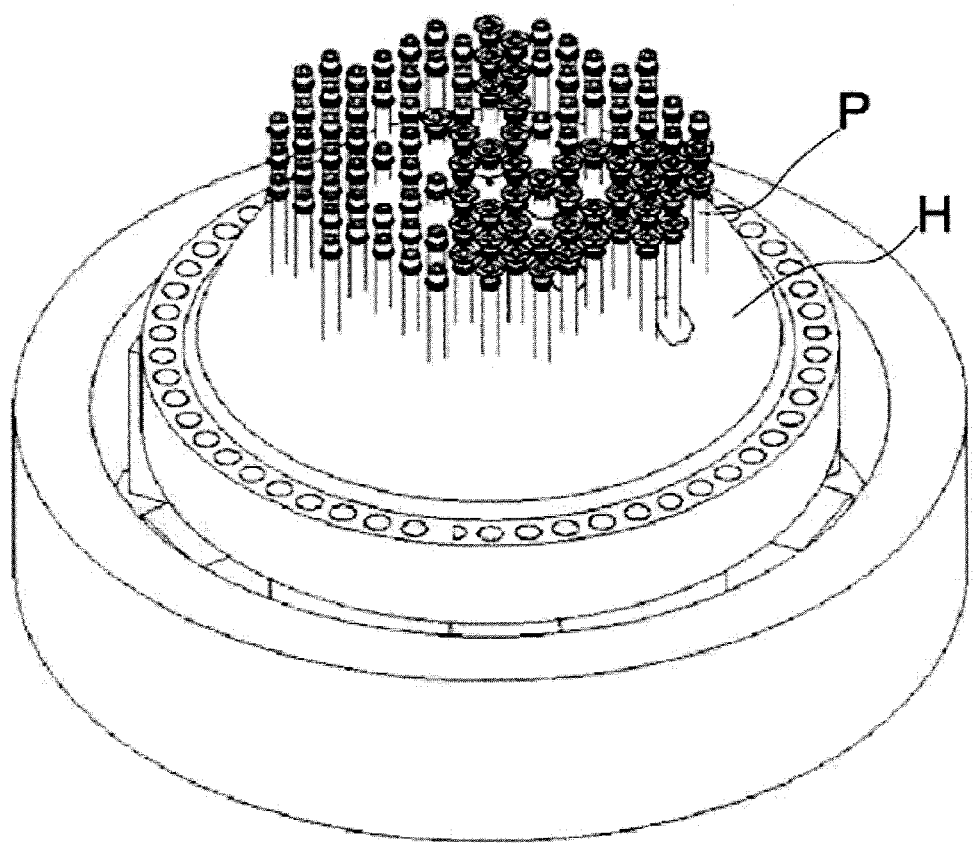
FIG. 18 is a perspective view illustrating a general nuclear reactor head.
Figure 19:
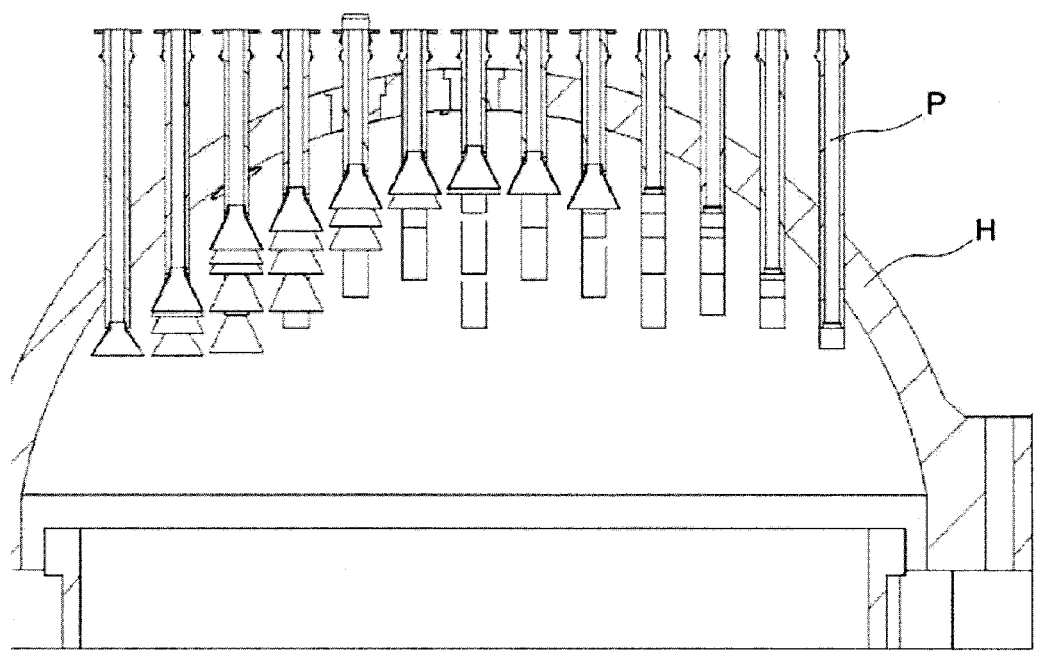
FIG. 19 is a cross-sectional view of the nuclear reactor head illustrated in FIG. 18.

Here, regarding the operation of the inspection apparatus according to the first exemplary embodiment of the present disclosure, as illustrated in FIGS. 18 and 19, the penetration pipe P is formed at the nuclear reactor head, in which a plurality of penetration pipes P is formed or arranged in a form similar to a honeycomb structure, and divided into portions having the same length and portions having different lengths. Accordingly, the movement of the inspection apparatus and the inspection method according thereto, which will be described below, are merely an exemplary embodiment in order to assist in the technical understanding of the present disclosure, and it is obvious that the movement of the inspection apparatus and the inspection method may be variously changed in accordance with various operational sequences and arrangements of the penetration pipes P. In addition, the movements of the inspection apparatuses for a penetration pipe of a nuclear reactor head according to various exemplary embodiments of the present disclosure will be described while distinguishing a linear movement and a rotational movement according to a length of the formed penetration pipe. It is obvious to those skilled in the art that the movement and the inspection may be performed by the combination of the linear movement and the rotational movement.

A. Inspection of the Penetration Pipe P According to the Linear Movement of the Inspection Apparatus 100

Figure 5A:
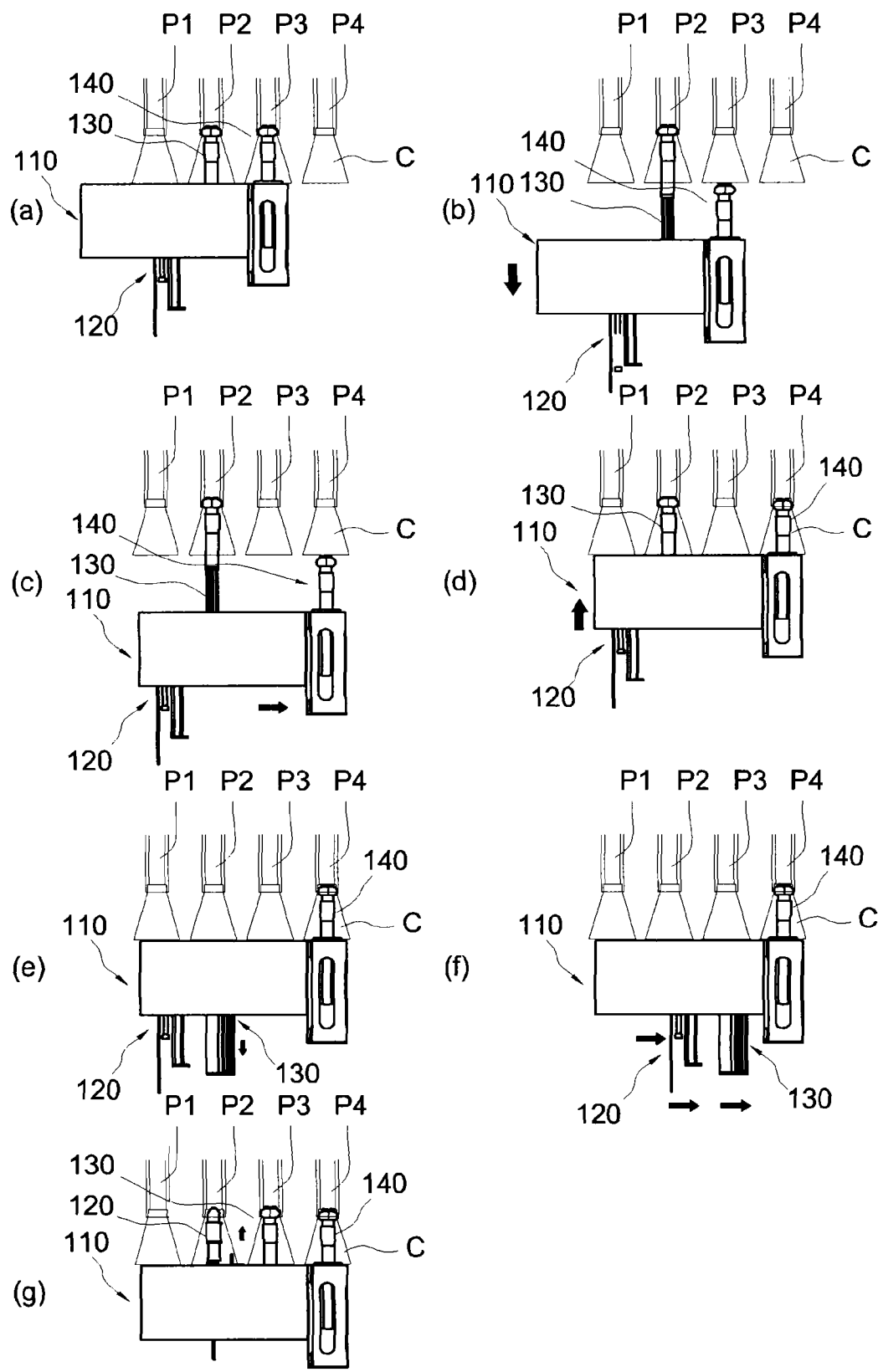
FIGS. 5A and 5B are operational views for explaining a linear movement and an inspection method of the inspection apparatus for a penetration pipe of a nuclear reactor head according to the first exemplary embodiment of the present disclosure.
Figure 5B:
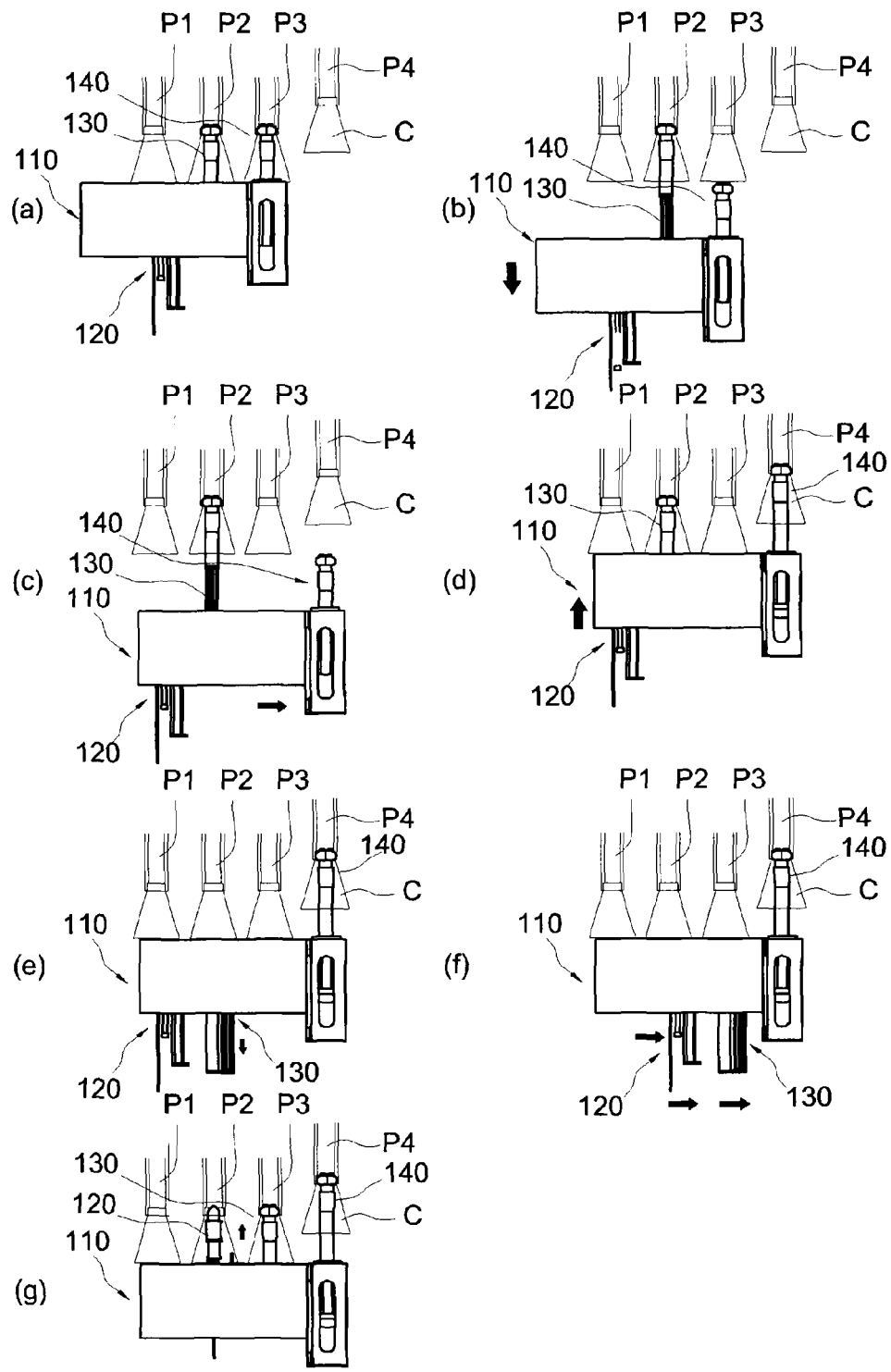

FIGS. 5A and 5B are operational views for explaining a linear movement and an inspection method of the inspection apparatus 100 for the penetration pipe of the nuclear reactor head according to the first exemplary embodiment of the present disclosure.

Referring to FIGS. 5A and 5B, regarding a first penetration pipe P1 to a fourth penetration pipe P4, in a case in which the first penetration pipe P1 is an object for an initial measurement inspection, the inspection apparatus 100 for the penetration pipe of the nuclear reactor head, as illustrated in (a) of FIG. 5A, may be installed in an initial posture in which the inspection apparatus 100 is fixed to a second penetration pipe P2 and a third penetration pipe P3 by the fixing module 130 and the rotating module 140, respectively. Here, the probe 122 is drawn into the body 110 at a position which the probe 122 coincides with a central axis of the first penetration pipe P1.

After the probe 122 inspects the first penetration pipe P1 while being lifted up and down by the probe lifting unit 123, the inspection of the first penetration pipe P1 is completed as the probe 122 is drawn into the body 110.

Thereafter, in order to inspect the second penetration pipe P2, the movement of the inspection apparatus 100 is performed. To this end, the expanding cylinder 150 is released from the third penetration pipe P3 by contracting the expanding cylinder 150 of the rotating shaft 142. Thereafter, the fixing shaft 132 of the fixing module 130 is lifted up by the third cylinder 133b in the second stage, and thereby the body 110 is relatively lifted down, as illustrated in (b) of FIG. 5A.

When the body 110 is lifted down, the fixing shaft moving motor 134a of the fixing shaft moving unit 134 is operated so that the rotating shaft 142 is positioned at a position of the fourth penetration pipe P4. Here, because the fixing shaft 132 is fixed to the second penetration pipe P2, when the fixing shaft moving motor 134a is operated, the body 110 is relatively moved as illustrated in (c) of FIG. 5A, and therefore, the rotating shaft 142 is positioned at the fourth penetration pipe P4.

When the movement of the body 110 is completed, the fixing shaft 132 is operated to be positioned at a first stage lifting up position by operating the third cylinder 133b of the fixing module 130, and thereby the body 110 is relatively lifted up as illustrated in (d) of FIG. 5A. Here, the expanding cylinder 150 of the rotating shaft 142 may be naturally inserted in the fourth penetration pipe P4.

Meanwhile, in a case in which a length of the fourth penetration pipe P4 is different (for example, the length of the fourth penetration pipe P4 is shorter than that of the third penetration pipe), as illustrated in (d) of FIG. 5B, the rotating shaft expanding cylinder 150 may be inserted in the fourth penetration pipe P4 by lifting up the rotating shaft 142 by operating the second motor 143.

When the rotating shaft 142 is inserted in the fourth penetration pipe P4, the rotating shaft 142 is fixed to the fourth penetration pipe P4 by expanding an outer diameter of the expanding cylinder 150 of the rotating shaft 142. In addition, when the fixing by the expanding cylinder 150 of the rotating shaft 142 is performed, the fixing with the second penetration pipe P2 is released by contracting the expanding cylinder 135 of the fixing shaft 132.

Thereafter, as illustrated in (e) of FIG. 5A, the fixing shaft 132 is lifted down to be drawn into the body 110 by operating the second cylinder 133a, and as illustrated in (f) of FIG. 5A, the fixing module 130 is moved by operating the fixing shaft moving motor 134a so that the fixing shaft 132 is positioned at the third penetration pipe P3. Here, the probe moving motor 124a is operated together with the operation of the fixing shaft moving motor 134a so that the probe 122 of the probe module 120 is positioned at the second penetration pipe P2.

When the fixing module 130 and the probe module 120 are moved, respectively, the probe 122 is lifted up to inspect the second penetration pipe P2 after the fixing shaft 132 is lifted up by the second cylinder 133a in the first stage to be inserted into and fixed to the third penetration pipe P3. Thereafter, the inspection operation of other penetration pipes may be performed by repeatedly performing the aforementioned movement.

B. Inspection of the Penetration Pipe P According to the Rotational Movement of the Inspection Apparatus 100

Figure 6:
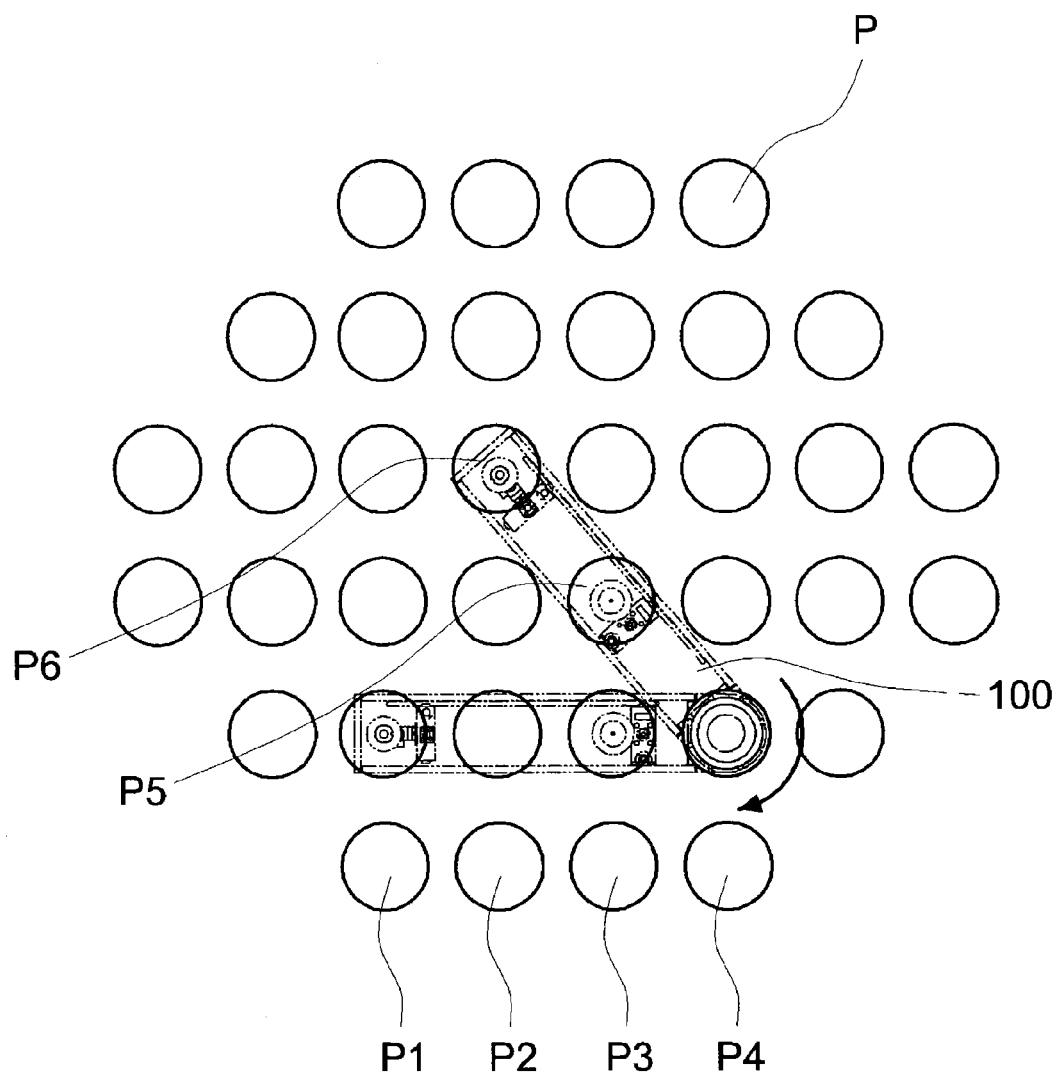
FIG. 6 is an operational view for explaining a rotational movement and an inspection method of the inspection apparatus for a penetration pipe of a nuclear reactor head according to the first exemplary embodiment of the present disclosure.

FIG. 6 is an operational view for explaining a rotational movement and an inspection method of the inspection apparatus 100 for the penetration pipe of the nuclear reactor head according to the first exemplary embodiment of the present disclosure.

Referring to FIG. 6, in a case in which the first penetration pipe P1 is an object for an initial measurement inspection, the inspection apparatus 100 for a penetration pipe of a nuclear reactor head may be installed in an initial posture in which the inspection apparatus 100 is fixed to the second penetration pipe P2 and the third penetration pipe P3 by the fixing module 130 and the rotating module 140, respectively. Here, the probe 122 is drawn into the body 110 at the position which the probe 122 coincides with the central axis of the first penetration pipe P1.

After the probe 122 inspects the first penetration pipe P1 while being lifted up and down by the probe lifting unit 123, the inspection of the first penetration pipe P1 is completed as the probe 122 is drawn into the body 110.

Thereafter, in order to inspect a sixth penetration pipe P6, the movement of the inspection apparatus 100 is performed. To this end, after the fixing is released by contracting the expanding cylinder 135 of the fixing shaft 132, the fixing shaft 132 is lifted down to be positioned in the body 110 by operating the second cylinder 133a.

When the fixing shaft 132 is lifted down to be positioned in the body 110, the body 110 is rotated by operating the body rotating motor 144 of the rotating module 140 so that the body is positioned on the same line as the fifth penetration pipe P5 and the sixth penetration P6.

When the body 110 is rotated, the fixing shaft 132 is moved so as to coincides with a central axis of the fifth penetration pipe P5 by operating the fixing shaft moving motor 134a of the fixing module 130. Thereafter, the fixing shaft 132 is inserted in the fifth penetration pipe P5 by operating the second cylinder 133a, and the fixing shaft 132 is fixed to the fifth penetration pipe P5 by expanding the expanding cylinder 135 of the fixing shaft 132.

In addition, the probe module 120 is moved by operating the probe moving motor 124a so as for the probe 122 to coincide with a central axis of the sixth penetration pipe P6 at the same time of the operation of the fixing shaft moving motor 134a. Thereafter, the sixth penetration pipe P6 is inspected by lifting up the probe 122.

Meanwhile, in a case in which a length of the fifth penetration pipe P5 is short, the fixing shaft 132 is lifted up in the second stage by operating the third cylinder 133b together with the second cylinder 133a of the fixing module 130.

In addition, the inspection of the penetration pipe P which is in a radius of rotation of the inspection apparatus 100 may be performed by repeatedly performing the rotational movement based on the rotating shaft 142 fixed to the fourth penetration pipe P4.

Figure 7:
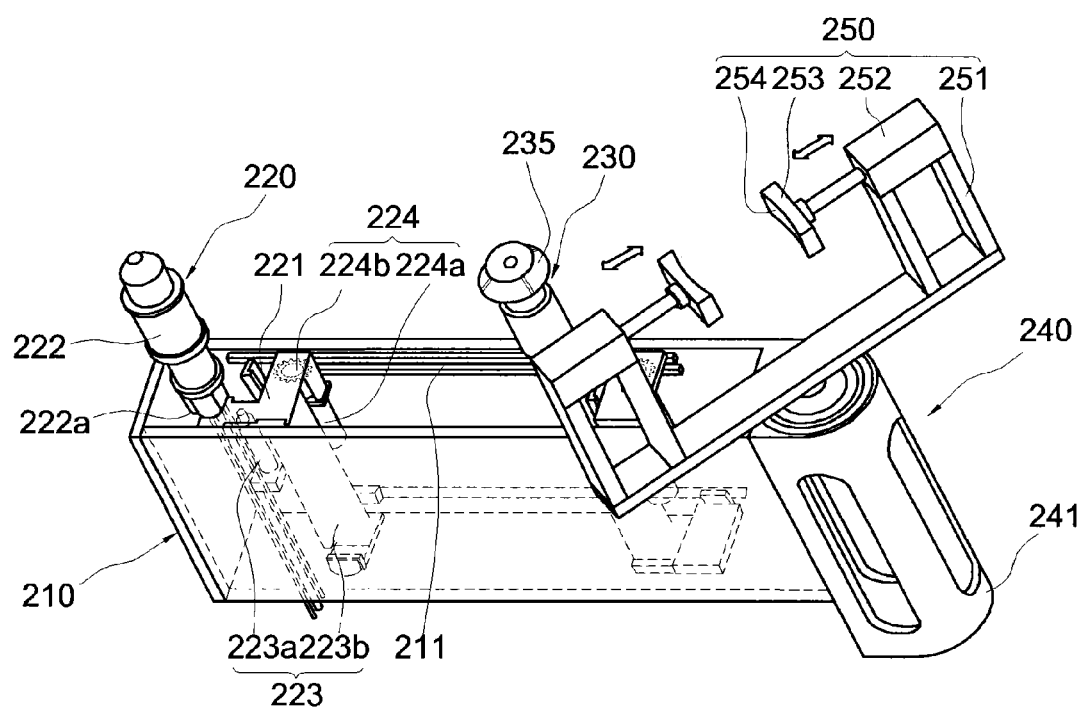
FIG. 7 is a perspective view illustrating an inspection apparatus for a penetration pipe of a nuclear reactor head according to a second exemplary embodiment of the present disclosure.

FIG. 7 is a perspective view illustrating an inspection apparatus 200 for a penetration pipe of a nuclear reactor head according to a second exemplary embodiment of the present disclosure.

Referring to FIG. 7, the inspection apparatus 200 for the penetration pipe of the nuclear reactor head according to the second exemplary embodiment of the present disclosure includes a body 210, and a probe module 220, a fixing module 230, and a rotating module 240, which are installed in a longitudinal direction of the body 210.

Here, because the body 210, the probe module 220, and the fixing module 230 are similar or identical to the body 110, the probe module 120, and the fixing module 130, which are described in the above first exemplary embodiment, of a inspection apparatus 100 for a penetration pipe of the nuclear reactor head, hereinafter, the specific description thereof will be omitted.

The rotating module 240 may include a rotating shaft housing 241 integrally formed with the body 210, a rotating shaft received in the rotating shaft housing, a second motor for lifting up and down the rotating shaft, and a body rotating motor for rotating the body using the rotating shaft as a rotational point.

Here, the rotating shaft housing 241, the second motor, and the body rotating motor may be similar or identical to the rotating shaft housing 141, the second motor 143, and the body rotating motor 144 of the first exemplary embodiment of the present disclosure, which are described above.

The rotating shaft may include an outer diameter support gripper 250 which is formed at an end of the rotating shaft and fixed to an outer diameter of the penetration pipe P. The outer diameter support gripper 250 may include a gripper frame 251 having a 'U' shaped structure, a gripper cylinder 252 which is provided at both ends of the gripper frame 251, and a gripper block 253 formed at the gripper cylinder 252.

The outer diameter support gripper 250 is lifted up and down together with a lifting up and down operation of the rotating shaft, and the gripper cylinder 252 may be operated by working fluid by pneumatic pressure or hydraulic pressure.

The gripper block 253 may be in closely contact with the outer diameter of the penetration pipe P to be fixed and the fixing of the gripper block 253 may be released in accordance with an operation of the gripper cylinder 252. In addition, a groove 254, which has a curvature similar to that of the outer diameter of the penetration pipe P, may be formed at one side of the gripper block 253 so that the gripper block 253 may be more firmly fixed to the penetration pipe P.

In addition, the inspection apparatus 200 for a penetration pipe of a nuclear reactor head according to the second exemplary embodiment of the present disclosure may include a sensor and a camera in order to improve precision of a position and a movement of each module.

A movement and inspection method of the inspection apparatus 200 for a penetration pipe of a nuclear reactor head according to the second exemplary embodiment of the present disclosure as described above, has only a difference compared to the first exemplary embodiment in that the outer diameter support gripper 250 instead of the expanding cylinder 150 is configured at the rotating shaft 242 to fix the outer diameter of the penetration pipe P, and the overall operation and inspection method thereof may be similar or identical to that of the first exemplary embodiment.

Figure 8:
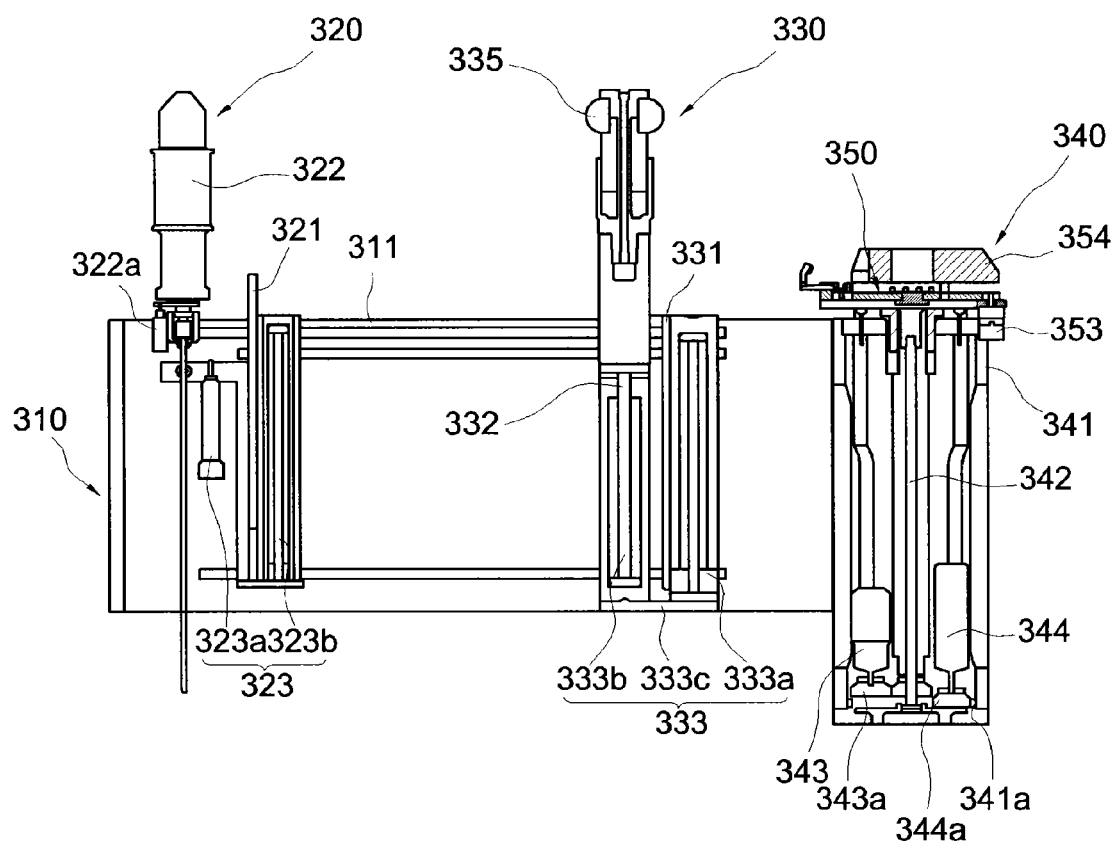
FIG. 8 is a front view illustrating an inspection apparatus for a penetration pipe of a nuclear reactor head according to a third exemplary embodiment of the present disclosure.
Figure 9:
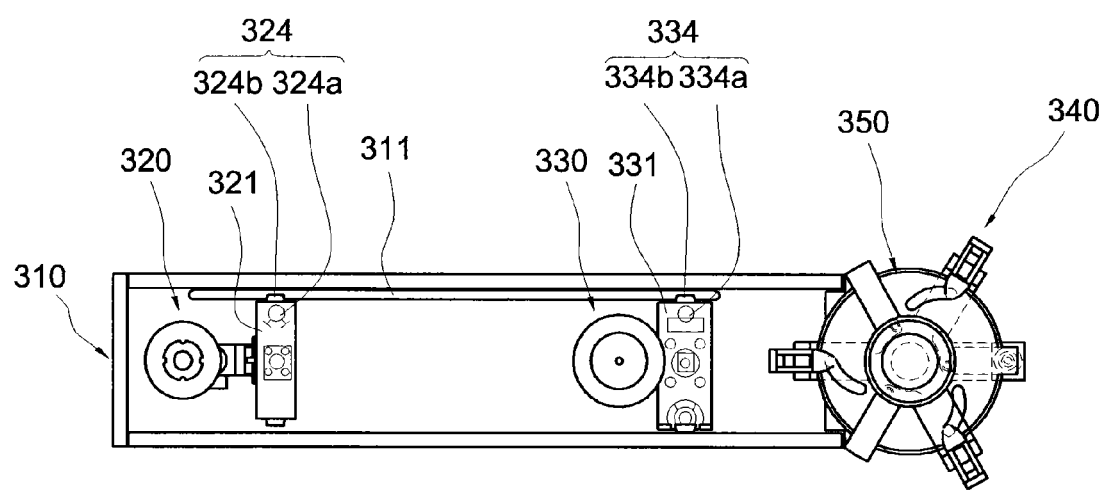
FIG. 9 is a top view of the inspection apparatus for a penetration pipe of a nuclear reactor head according to the third exemplary embodiment of the present disclosure.
Figure 10:
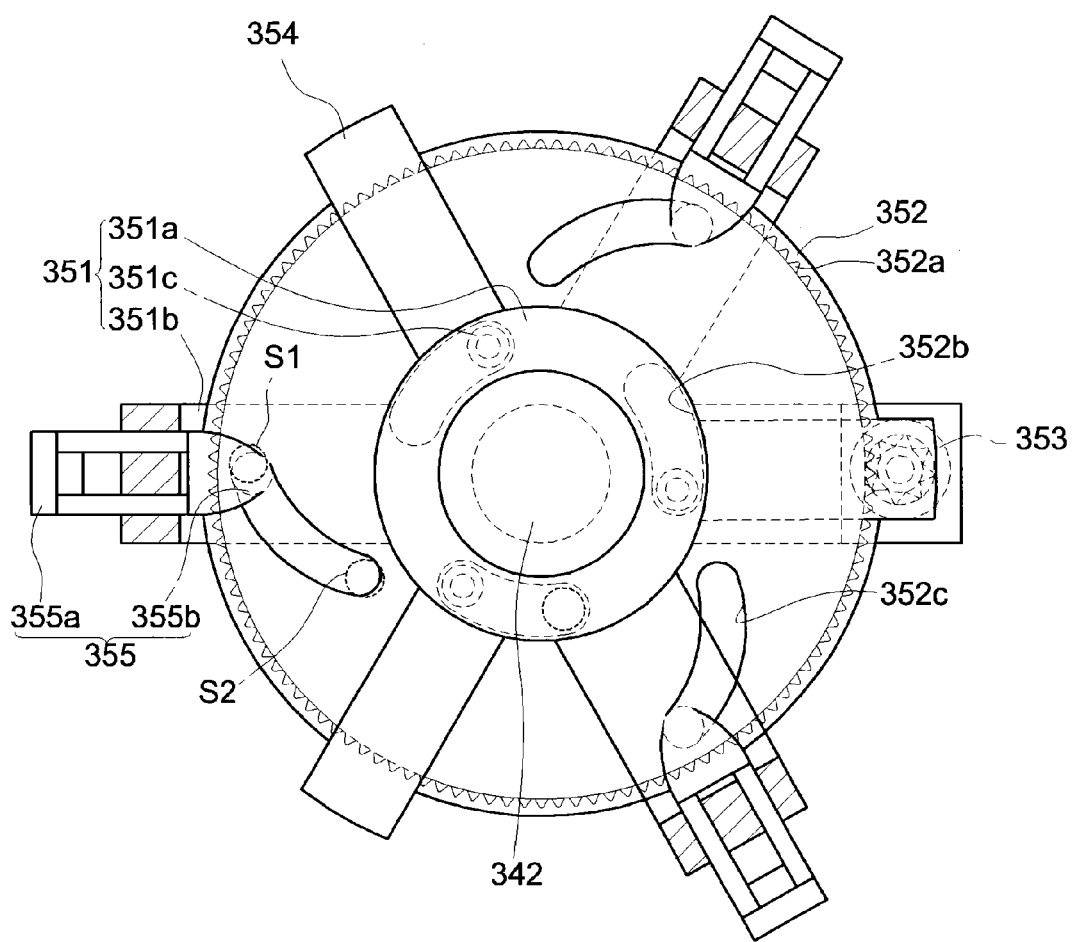
FIG. 10 is a detailed view schematically illustrating a cone support rotating gripper of the inspection apparatus for a penetration pipe of a nuclear reactor head according to the third exemplary embodiment of the present disclosure.

FIG. 8 is a front view illustrating an inspection apparatus 300 for a penetration pipe of a nuclear reactor head according to a third exemplary embodiment of the present disclosure. FIG. 9 is a top view of the inspection apparatus 300 for a penetration pipe of a nuclear reactor head according to the third exemplary embodiment of the present disclosure. FIG. 10 is a detailed view schematically illustrating a cone support rotating gripper 350 of the inspection apparatus 300 for a penetration pipe of a nuclear reactor head according to the third exemplary embodiment of the present disclosure.

Referring to FIGS. 8 to 10, the inspection apparatus 300 for a penetration pipe of a nuclear reactor head according to the third exemplary embodiment of the present disclosure includes a body 310, and a probe module 320, a fixing module 330, and a rotating module 340, which are installed in a longitudinal direction of the body 310.

Here, the body 310, the probe module 320, and the fixing module 330 may be formed to be similar or identical to the body 110, the probe module 120, and the fixing module 130 which are described in the above first exemplary embodiment.

Hereinafter, the rotating module 340 which is different from those of the above exemplary embodiments will be described.

The rotating module 340 may include a rotating shaft housing 341 integrally formed with the body 310, a rotating shaft 342 received inside the rotating shaft housing 341, a second motor 343 for lifting up and down the rotating shaft 342, and a body rotating motor 344 for rotating the body 310 about the rotating shaft 342 as a rotational point.

Here, the rotating shaft housing 341, the second motor 343, and the body rotating motor 344 may be similar or identical to the rotating shaft housing 141, the second motor 143, and the body rotating motor 144 of the first exemplary embodiment of the present disclosure, which are described above.

The rotating shaft 342 may include a cone support rotating gripper 350 in order to support an outer diameter of a cone C of the penetration pipe P, and a cone guide unit 354.

The cone guide unit 354 is a unit to guide the rotating shaft 352 so as to be naturally inserted in the penetration pipe P when the rotating shaft 352 is fixed to the penetration pipe P, and may be formed to have a two cone structures in which an upper portion thereof is sheared.

The cone support rotating gripper 350 may include a base frame 351 having a windmill structure formed at an end of the rotating shaft 352, a rotating plate 352 coupled to the base frame 351 to be rotatable about a rotating axis that is a center point of the base frame 351, and a rotating plate rotating motor 353 for rotating the rotating plate 352.

The base frame 351 includes a circular frame 351a, and wing portions 351b formed at equal intervals based on a center point of the circular frame 351a. The circular frame 351a is fixedly coupled to an upper end of the rotating shaft 342, and may include a plurality of cone guide unit fixing protrusions 351c which is coupled to the cone guide unit 354.

A cone support finger 355, which is movable along an end of the wing portion 351b, may be provided at each of the wing portions 351b. One side of the cone support finger 355 is bent (355a) so as to be able to support the outer diameter of the cone C, and the other side of the cone support finger 355 may be connected to a guide pin 355b. Accordingly, the cone support finger 355 may be moved at the ends of the wing portions 355 in accordance with the movement of the guide pin 355b.

The rotating plate 352 is coupled to the base frame 351a so as to be rotatable about a central axis of the circular frame 351a of the base frame 351, and may include a plurality of guide holes 352b and 352c. Here, the plurality of guide holes 352b and 352c may be divided into a first guide hole 352b formed to correspond to the cone guide unit fixing protrusion 351c, and a second guide hole 352c formed to correspond to the guide pin 355b. In addition, saw teeth 352a may be formed along an outer circumferential surface of the rotating plate 352.

The rotating plate rotating motor 353 is provided to rotate the rotating plate 352, and may be formed at any one of the wing portions 351b. More specifically, the motor rotating shaft of the rotating plate rotating motor 353 is penetratingly coupled from a lower portion of the wing portion 351b, a gear, which is operated together with the saw teeth 352a of the rotating plate 352, is provided at the motor rotating shaft, and thereby the rotating plate 352 may be rotated in a forward/reverse direction by a forward/reverse operation of the rotating plate rotating motor 353.

Figure 11:
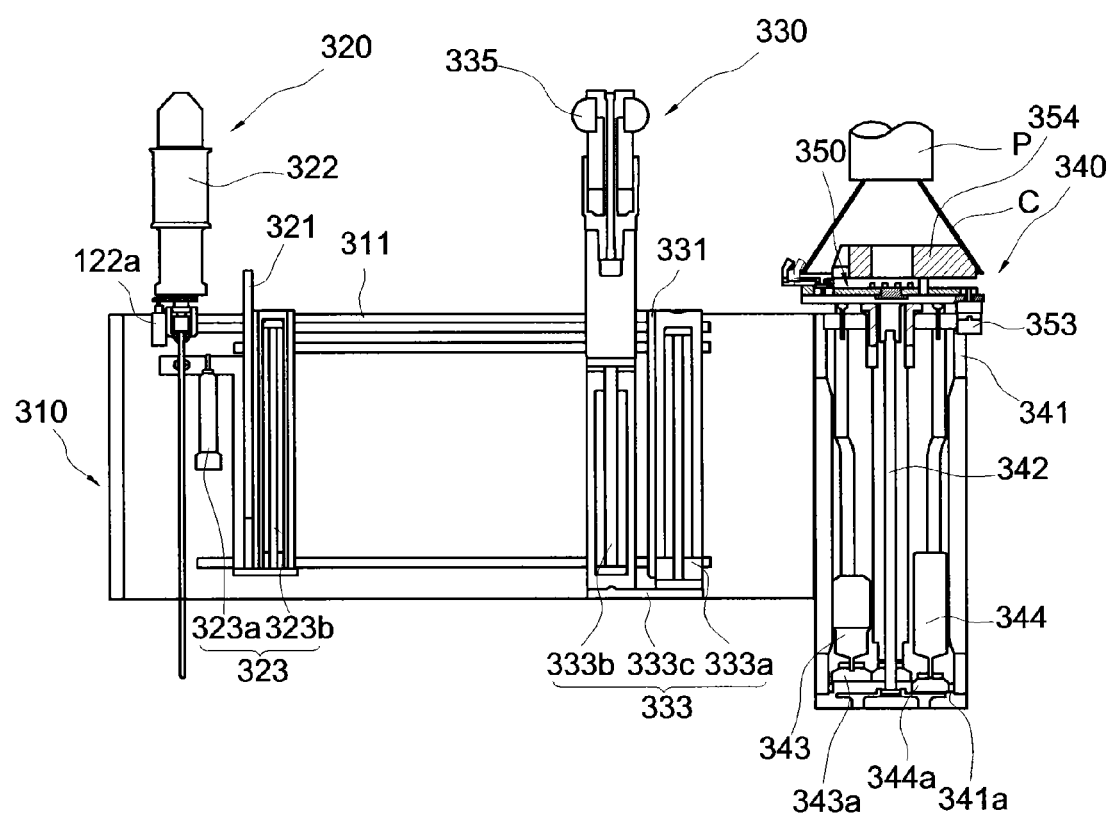
FIG. 11 is a front view schematically illustrating a coupling state between a penetration pipe and a cone support rotating gripper of the inspection apparatus for a penetration pipe of a nuclear reactor head according to the third exemplary embodiment of the present disclosure.
Figure 12:
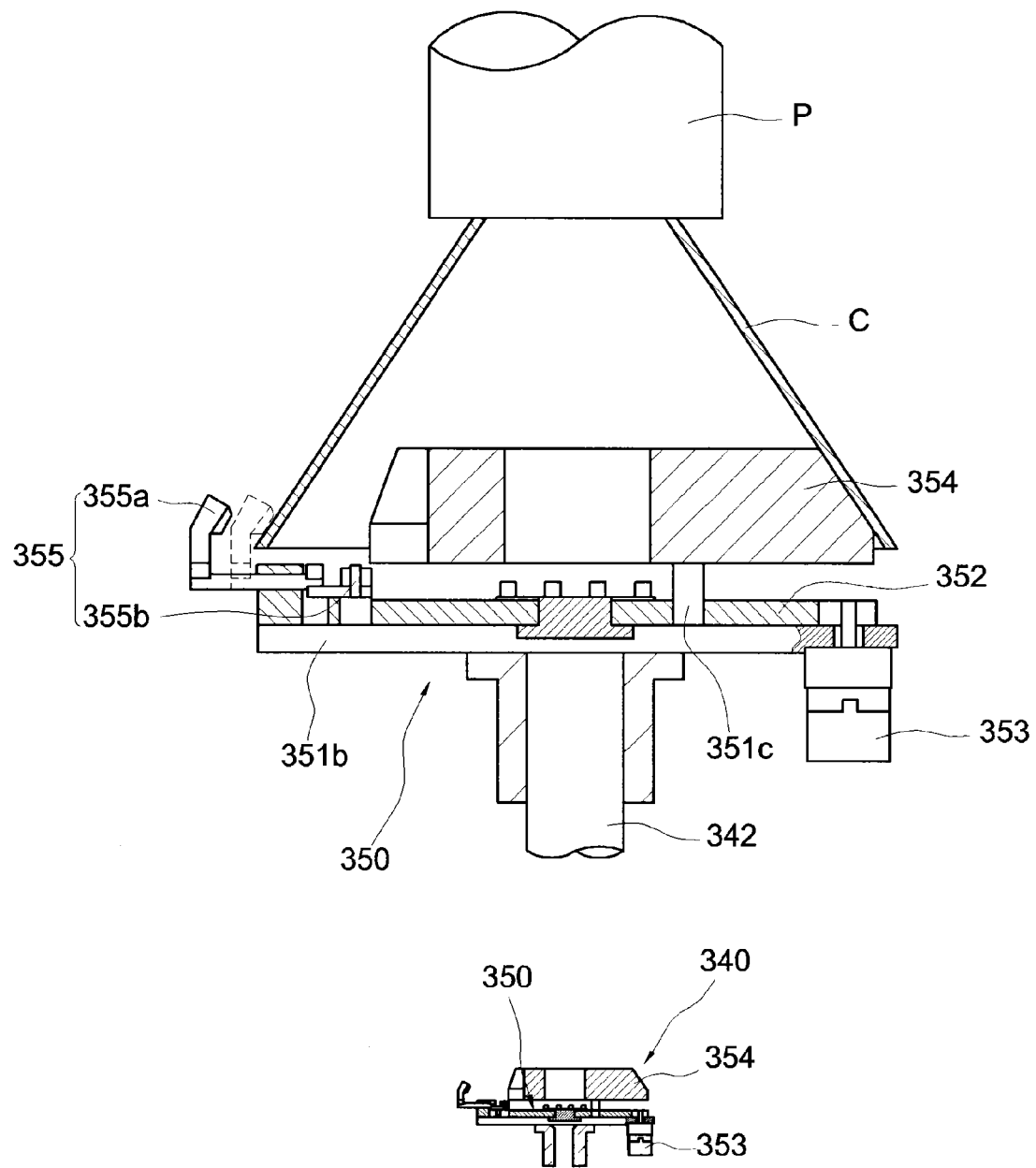
FIG. 12 is a detailed view illustrating a coupling structure between a penetration pipe and a cone support rotating gripper of the inspection apparatus for a penetration pipe of a nuclear reactor head illustrated in FIG. 11.

FIG. 11 is a front view schematically illustrating a coupling state between a penetration pipe P and a cone support rotating gripper 350 of the inspection apparatus 300 for a penetration pipe of a nuclear reactor head according to the third exemplary embodiment of the present disclosure. FIG. 12 is a detailed view illustrating a coupling structure between a penetration pipe P and a cone support rotating gripper 350 of the inspection apparatus 300 for the penetration pipe of the nuclear reactor head illustrated in FIG. 11.

Describing a method of fixing the penetration pipe P by the rotating module 340 with reference to FIGS. 11 and 12, when the rotating shaft 342 is lifted up to a position corresponding to the penetration pipe P, the cone guide unit 354 of the rotating shaft 342 is inserted in the cone C of the penetration pipe P, and the cone support rotating gripper 350 is positioned at a position corresponding to the cone C.

Here, as the rotating plate rotating motor 353 is operated in a forward direction, the rotating plate 352 is rotated in a forward direction. When the rotating plate 352 is rotated, the cone guide unit fixing protrusion 351c and the guide pin 355b are moved along the first guide hole 352b and the second guide hole 352c.

Accordingly, the guide pin 355b is moved from a first point S1 to a second point S2 along the second guide hole 352c, and the cone support finger 355 is moved along the ends of the wing portions 325b, so that the bent (355a) end is coupled to the cone to be fixed.

Meanwhile, in a method of releasing the penetration pipe P by the cone support rotating gripper 350, on the contrary to the method of fixing the penetration pipe P, the rotating plate 352 is rotated in a reverse direction by operating the rotating plate rotating motor 353 in a reverse direction so that the guide pin 355b is moved from the second point S2 to the first point S1, and thereby the coupling and support with the penetration pipe P may be released.

In addition, the inspection apparatus 300 for a penetration pipe of a nuclear reactor head according to the third exemplary embodiment of the present disclosure may also include a sensor and a camera in order to improve precision of a position and a movement of each module.

A movement and inspection method of the inspection apparatus 300 for a penetration pipe of a nuclear reactor head according to the third exemplary embodiment of the present disclosure as described above, has only a difference compared to the movement and inspection methods of the first and second exemplary embodiments in that how to support and fix the penetration pipe P by the rotating module 340 as the cone support rotating gripper 350 is formed at the rotating shaft, and the overall movement and method for inspection thereof may be similar or identical to those of the first and second exemplary embodiments.

Figure 13:
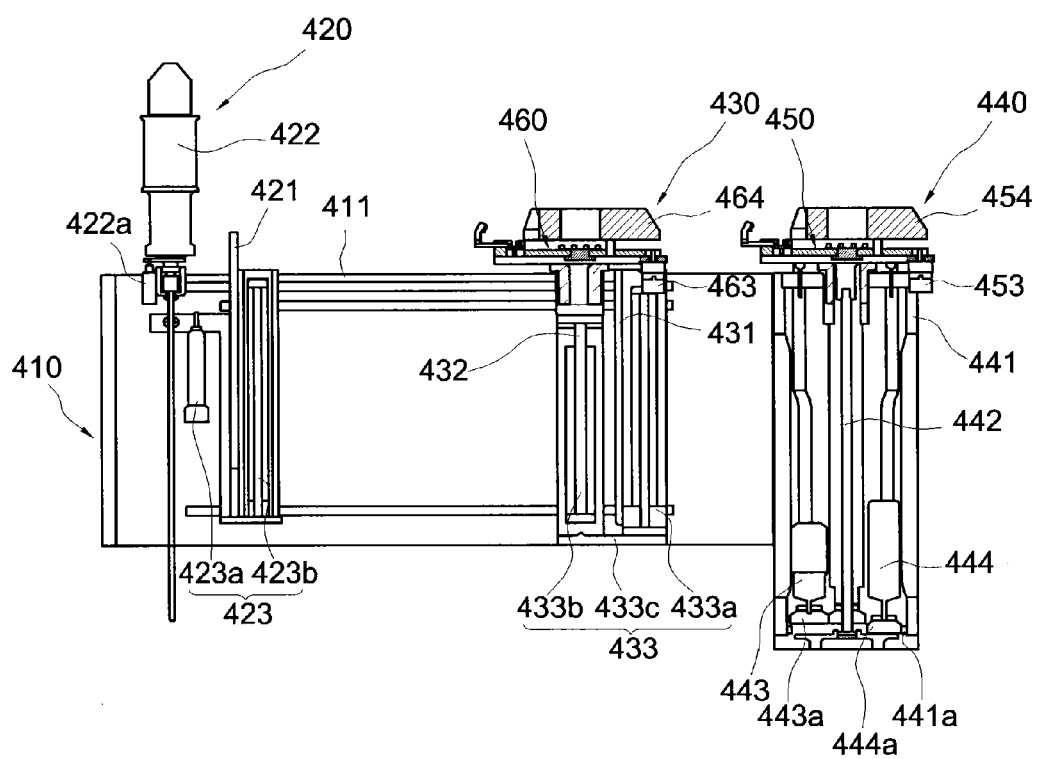
FIG. 13 is a front view illustrating an inspection apparatus for a penetration pipe of a nuclear reactor head according to a fourth exemplary embodiment of the present disclosure.
Figure 14:
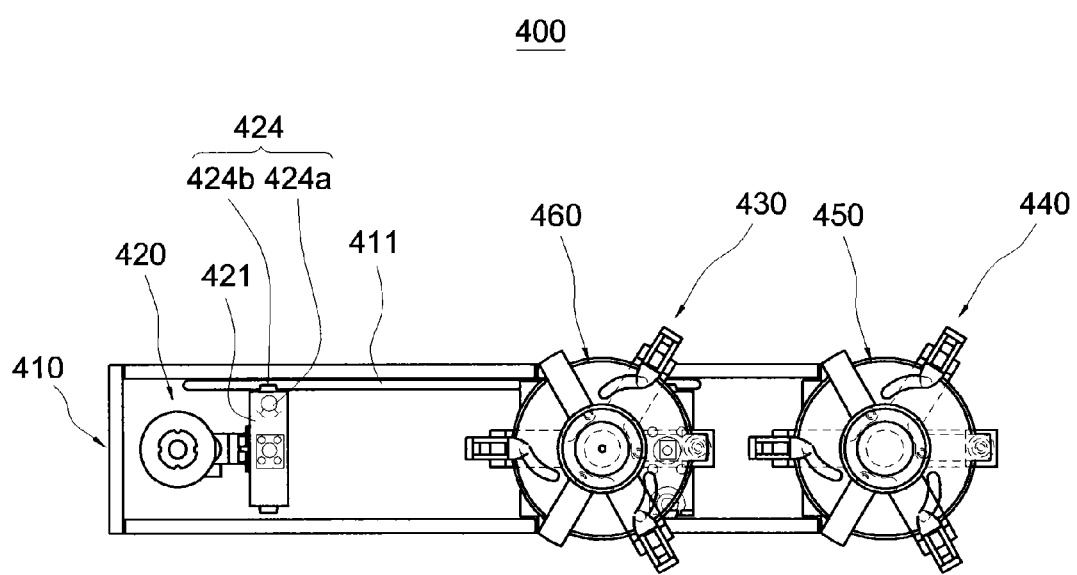
FIG. 14 is a top view illustrating the inspection apparatus for a penetration pipe of a nuclear reactor head according to the fourth exemplary embodiment of the present disclosure.
Figure 15:
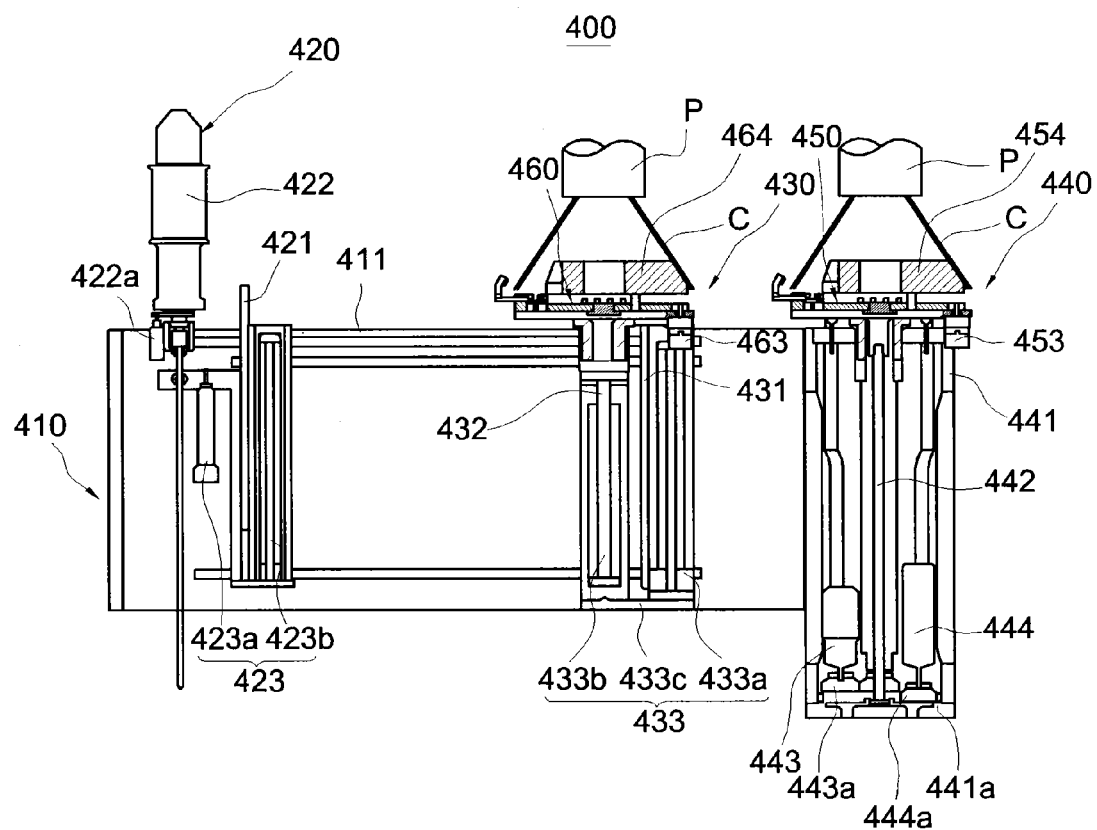
FIG. 15 is a coupling state view schematically illustrating a coupling state between a penetration pipe, and a fixing module and a rotating module of the inspection apparatus for a penetration pipe of a nuclear reactor head according to the fourth exemplary embodiment of the present disclosure.

FIG. 13 is a front view illustrating an inspection apparatus 400 for a penetration pipe of a nuclear reactor head according to a fourth exemplary embodiment of the present disclosure. FIG. 14 is a top view illustrating the inspection apparatus 400 for a penetration pipe of a nuclear reactor head according to the fourth exemplary embodiment of the present disclosure. FIG. 15 is a coupling state view schematically illustrating a coupling state between a penetration pipe P, and a fixing module 430 and a rotating module 440 of the inspection apparatus 400 for a penetration pipe of a nuclear reactor head according to the fourth exemplary embodiment of the present disclosure.

Referring to FIGS. 13 to 15, the inspection apparatus 400 for a penetration pipe of a nuclear reactor head according to the fourth exemplary embodiment of the present disclosure includes a body 410, and a probe module 420, a fixing module 430, and a rotating module 440, which are installed in a longitudinal direction of the body 410.

Here, the inspection apparatus 400 of a penetration pipe of a nuclear reactor head according to the fourth exemplary embodiment of the present disclosure has only a difference compared to the inspection apparatus 300 for a penetration pipe of a nuclear reactor head according to the third exemplary embodiment in that a cone support rotating gripper 460 instead of the expanding cylinder is formed at the fixing module 430, and the overall configuration except for the fixing module 460, and the movement and inspection method thereof may be similar or identical to those of the third exemplary embodiment.

Figure 16:
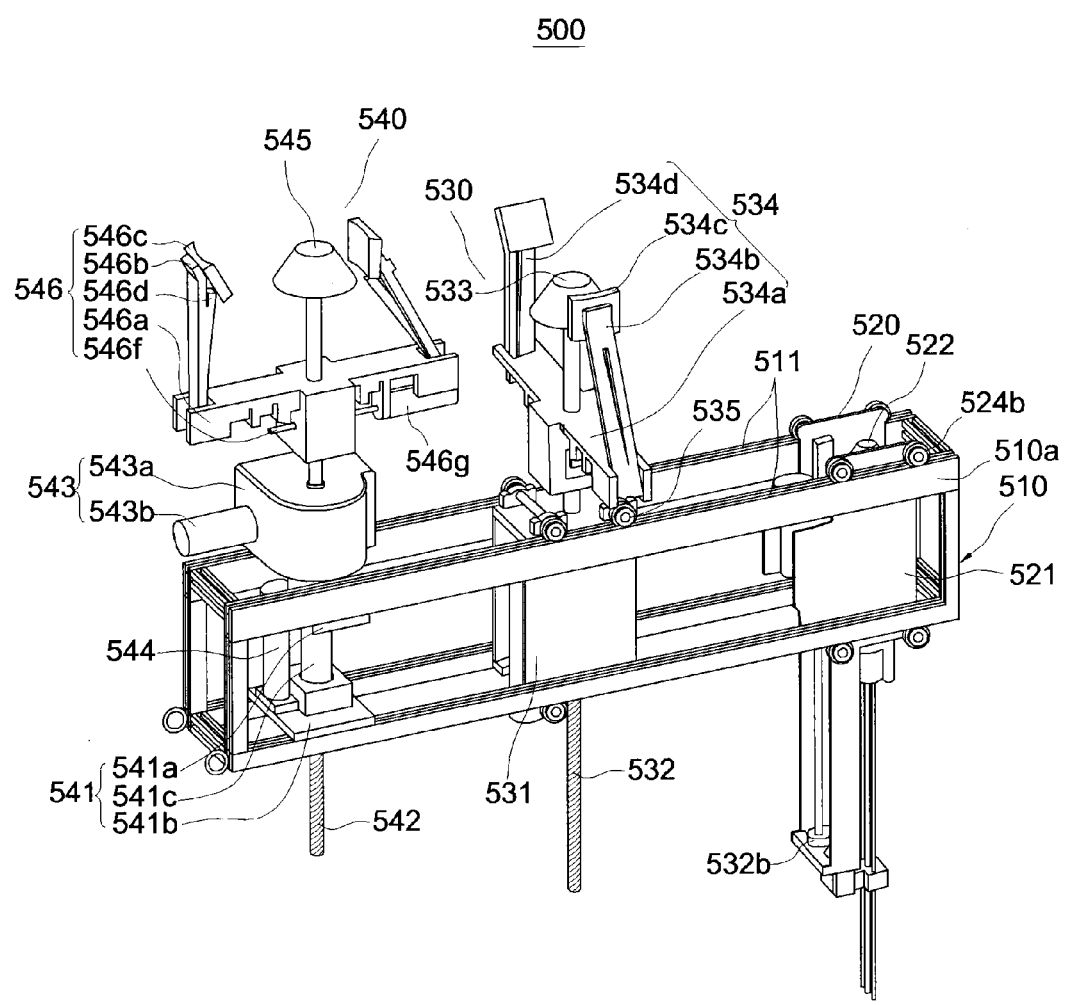
FIG. 16 is a perspective view of an inspection apparatus for a penetration pipe of a nuclear reactor head according to a fifth exemplary embodiment of the present disclosure.
Figure 17:
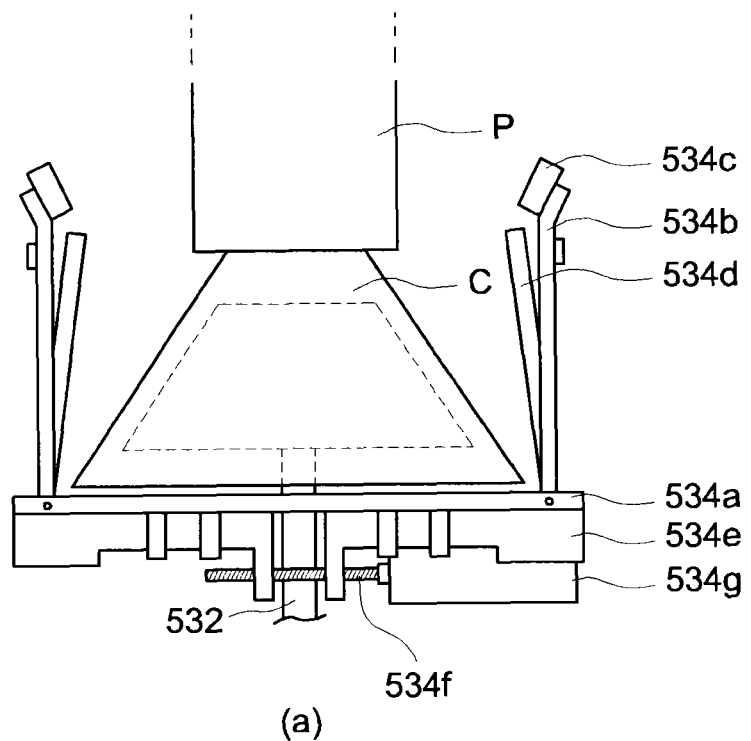
FIG. 17 is a coupling state view illustrating a coupling structure between a penetration pipe and a cone support gripper which is formed at a fixing shaft of a fixing module of the inspection apparatus for a penetration pipe of a nuclear reactor head according to the fifth exemplary embodiment of the present disclosure.
Figure 17:
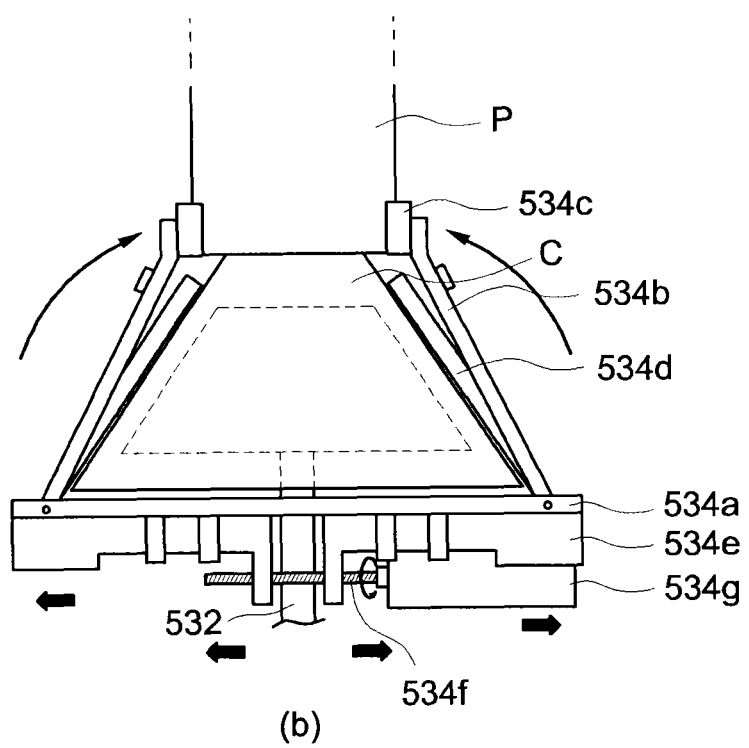

FIG. 16 is a perspective view illustrating an inspection apparatus 500 for a penetration pipe of a nuclear reactor head according to a fifth exemplary embodiment of the present disclosure. FIG. 17 is a coupling state view illustrating a coupling structure between a penetration pipe P and a cone support gripper 534 which is formed at a fixing shaft 532 of the inspection apparatus 500 for a penetration pipe of a nuclear reactor head according to the fifth exemplary embodiment of the present disclosure.

Referring to FIGS. 16 to 17, the inspection apparatus 500 for a penetration pipe of a nuclear reactor head according to the fifth exemplary embodiment of the present disclosure includes a body 510, and a probe module 520, a fixing module 530, and a rotating module 540, which are installed in a longitudinal direction of the body 510.

The body 510 has an internal space and may be formed with a plurality of frames having a jig structure which extends in a vertical direction. Here, a guide rail unit 511 may be formed at a horizontal frame 510a, which configures the body 510, in order to guide the movements of the probe module 520 and the rotating module 530. Here, the guide rail unit 511 may be formed with a rail having a saw tooth structure or a screw structure.

The probe module 520 may be identical or similar to the probe modules 120, 220, 320, and 420 disclosed in the first to fourth exemplary embodiments except that the probe module 520 is moved along a guide rail unit 511 formed in the horizontal frame 510a of the body 510.

The fixing module 530 is provided at the body 510 in order to fix the body 510 to the penetration pipe P, and may include a fixing shaft fixing frame 531, a fixing shaft 532 having a screw, a fixing shaft lifting unit for lifting up and down the fixing shaft 532, and a fixing shaft moving unit for moving the fixing module 530 along the body 510.

The fixing shaft 532 may include a cone guide unit 533 formed at an end of the fixing shaft 532 so as to facilitate insertion in the penetration pipe P. In addition, the fixing shaft 532 may include a cone support gripper 534 which supports an outer diameter of the penetration pipe P and an outer diameter of a cone C.

The cone support gripper 534 may include a cone support frame 534a, a cone support finger which is hingedly coupled to both ends of the cone support frame 534a and has a cone support plate 534c at one side thereof, and a cone support finger operating unit for operating the cone support finger.

The cone support frame 534a is penetratingly coupled to the fixing shaft 532, and may include a pair of blocks 534e connected to the cone support finger which is hingedly coupled to both ends of the cone support frame 534a in a longitudinal direction, and a screw bar 534f connected to the blocks 534e.

The cone support finger may be formed to be divided into a first finger frame 534b having an outer diameter support plate 543c at an end, and a second finger frame 534d which is formed to be separated from the first finger frame 534b and is in contact with the outer diameter of the cone C. The outer diameter support plate 534c formed at the first finger frame 534b supports an outer diameter of an upper end of the cone C of the penetration pipe P, and may formed to have the same curvature as that of the outer diameter of the penetration pipe P. In addition, the second finger frame 534d may be formed to protrude from the first finger frame 534b at the same angle as an angle at which the cone C is formed.

The cone support finger operating unit may include a motor 534g formed at the cone support frame 534a. The motor 534g changes an interval between the blocks 534e by being operated in a forward/reverse direction together with an operation of the screw bar 534*f* formed at the cone support frame 534*a*, thereby shortening or lengthening the interval between the cone support fingers.

The fixing shaft lifting unit may include any one of a screw jack, a ball screw, and square threads, which are operated together with the fixing shaft 532. In addition, the fixing shaft lifting unit may include a motor for driving the screw jack, the ball screw, or the square threads. Accordingly, the fixing shaft may be lifted up and down by operating the motor in a forward/reverse direction.

The fixing shaft moving unit may include a fixing shaft moving motor (not illustrated) including a plurality of gears 535, or a ball screw and square threads, which are operated together with the guide rail unit 511. Specifically, in a case in which the guide rail unit 511 has a saw tooth structure, a gear may be provided at the fixing shaft moving motor, and in a case in which the guide rail unit 511 has a screw structure, the fixing shaft moving motor may be provided with the ball screw and the square threads. Therefore, the fixing module 530 may be moved along the body 510 by a forward/reverse operation of the fixing shaft moving motor.

The rotating module 540 may include a rotating shaft fixing frame 541 installed at the body 510, a rotating shaft 542 having a screw, a rotating shaft lifting unit 543 for lifting up and down the rotating shaft 542, and a body rotating unit 544 for rotating the body 541 about the rotating shaft 542.

The rotating shaft fixing frame 541 may include rotating shaft support plates 541*a* and 541*b* installed at upper and lower horizontal frames 510*a* of the body 510, respectively, and a support pipe 541*c* formed at the rotating shaft support plates 541*a* and 541*b*.

The rotating shaft 542 is penetratingly coupled to the rotating shaft fixing frame 541, and may include a cone guide unit 545 and a cone support gripper 546, which are formed at the rotating shaft 542. Here, the cone guide unit 545 and the cone support gripper 546 may be formed in the same structure as the cone guide unit 533 and the cone support gripper 534 of the fixing module.

The rotating shaft lifting unit 543 is provided to lift up and down the rotating shaft 542, and may be formed in a structure similar or identical to that of the fixing shaft lifting unit 532. Accordingly, the rotating shaft 542 may be lifted up and down by an operation in a forward/reverse direction of the motor 543*b* which is configured at the rotating shaft lifting unit 543.

The body rotating unit 544 may include a body rotating motor for rotating the body, and a rotating gear. A gear, which is operated together with the rotating gear, is provided at the body rotating motor, so that the body may be rotated about the rotating shaft by a forward/reverse operation of the body rotating motor.

In addition, the inspection apparatus 500 for a penetration pipe of a nuclear reactor head according to the fifth exemplary embodiment of the present disclosure may include a sensor and a camera in order to improve precision of a position and a movement of each module.

A movement and inspection method of the inspection apparatus 500 for a penetration pipe of a nuclear reactor head according to the fifth exemplary embodiment of the present disclosure as described above, has only a difference compared to the movement and inspection methods of the first to fourth exemplary embodiments in that the cone guides 533 and 545 and the cone support grippers 534 and 546 are formed at the fixing shaft 532 and the rotating shaft 542, respectively, and the motor having any one of the screw jack, the ball screw, and the square threads is provided as a configuration for lifting up and down the fixing shaft and the rotating shaft, and the overall movement and inspection method thereof may be similar or identical to those of the first to fourth exemplary embodiments.

As described above, the inspection apparatus for a penetration pipe of a nuclear reactor head according to various exemplary embodiments of the present disclosure may be applicable regardless of nuclear reactor models (Westinghouse, OPR 1000, APR1400, or the like) because the inspection apparatus is fixed and moved by supporting the inner and outer diameters of the head penetration pipe and the outer diameter of the cone.

In addition, because the inspection apparatus of the present disclosure may be fixed, linearly moved, and rotationally moved by using the penetration pipe of the nuclear reactor head, it is possible to inspect all penetration pipes, and reduce the movement time and the inspection time compared to the inspection apparatus of the related art.

In addition, the inspection apparatus according to various exemplary embodiments of the present disclosure may easily access a portion for inspection when the penetration pipe is inspected, and thereby the inspection time may be reduced.

Moreover, the inspection apparatus according to various exemplary embodiments of the present disclosure has a compact size, and therefore the movement, the installation, and the storage of the inspection apparatus may be easy.

The present disclosure described above is not limited to the aforementioned exemplary embodiments and the accompanying drawings, and it is apparent to those skilled in the art that various replacements, additions and changes may be made thereto within the technical spirit of the present disclosure.

What is claimed is:

1. An inspection apparatus for a penetration pipe formed at a nuclear reactor head, comprising:
   a body;
   a probe module installed at the body and having a probe which is inserted in the penetration pipe to inspect damage of the penetration pipe, the probe module being configured to move along a longitudinal direction of the body and move up and down along a vertical direction of the body so that the probe is drawn from an inside of the body to an outside of the body and drawn from the outside of the body into the inside of the body the vertical direction of the body being perpendicular to the longitudinal direction of the body;
   a fixing module installed at the body positioned at a distance from the probe module along the longitudinal direction of the body, configured to move along the longitudinal direction of the body, and having one of an expanding cylinder which is inserted in the penetration pipe to support an inner diameter of the penetration pipe and a cone support rotating gripper configured to support an outer diameter of a cone of the penetration pipe; and
   a rotating module fixed to the body installed at a distance from the fixing module in the longitudinal direction of the body and having one selected from the group consisting of: (1) an expanding cylinder which is inserted in the penetration pipe to support the inner diameter of the penetration pipe, (2) an outer diameter support gripper configured to support an outer diameter of the penetration pipe, and (3) a cone support rotating gripper configured to support said outer diameter of said cone of the penetration pipe.

2. The inspection apparatus according to claim 1, wherein the body includes a housing extending in a vertical direction to have a box shaped structure and having upper and lower surfaces in a horizontal direction which are opened, and a guide rail unit formed at an inner side of the housing and configured to guide movements of the probe module and the fixing module.

3. The inspection apparatus of claim 2, wherein the guide rail units are formed at inner sides of a front surface and a rear surface of the housing to be spaced apart from each other at a predetermined interval.

4. The inspection apparatus according to claim 1, wherein the probe module further includes a probe rotating motor configured to rotate the probe, a probe fixing frame to which the probe is fixed, a probe lifting unit formed at the probe fixing frame and configured to lift up and down the probe along the vertical direction of the body, and a probe moving unit formed at the probe fixing frame and configured to move a position of the probe along the longitudinal direction of the body.

5. The inspection apparatus of claim 4, wherein the probe lifting unit includes a motor or a cylinder to lift up and down the probe along the vertical direction of the body.

6. The inspection apparatus of claim 4, wherein the probe moving unit includes a probe moving motor including any one of a gear, a ball screw, and square threads to be operated together with the guide rail unit.

7. The inspection apparatus according to claim 1, wherein the fixing module further includes a fixing shaft at which the expanding cylinder is formed, a fixing shaft fixing frame to which the fixing shaft is fixed, a fixing shaft lifting unit configured to lift up and down the fixing shaft, and a fixing shaft moving unit formed at the fixing shaft fixing frame and configured to move a position of the fixing shaft by being moved along the guide rail unit.

8. The inspection apparatus of claim 7, wherein the fixing shaft lifting unit includes a motor or a cylinder to lift up and down the fixing shaft.

9. The inspection apparatus of claim 7, wherein the fixing shaft moving unit includes a fixing shaft moving motor including any one of a gear, a ball screw, and square threads to be operated together with the guide rail unit.

10. The inspection apparatus of claim 1, wherein the fixing module further includes a fixing shaft at which the cone support rotating gripper is formed, a fixing shaft fixing frame to which the fixing shaft is fixed, a fixing shaft lifting unit configured to lift up and down the fixing shaft, and a fixing shaft moving unit formed at the fixing shaft fixing frame and configured to move a position of the fixing shaft by being moved along the guide rail unit.

11. The inspection apparatus of claim 10, wherein the fixing shaft lifting unit includes a motor or a cylinder to lift up and down the fixing shaft.

12. The inspection apparatus of claim 10, wherein the fixing shaft moving unit includes a fixing shaft moving motor including any one of a gear, a ball screw, and square threads to be operated together with the guide rail unit.

13. The inspection apparatus of claim 1, wherein the rotating module includes a rotating shaft housing integrally formed with the body, a rotating shaft received in the rotating shaft housing and including at least one selected from the group consisting of (1) the expanding cylinder, (2) the outer diameter support gripper, and (3) the cone support rotating gripper, a second motor received in the rotating shaft housing and configured to lift up and down the rotating shaft, and a body rotating motor received in the rotating shaft housing and configured to rotate the body about the rotating shaft.

14. The inspection apparatus according to claim 13, wherein the rotating shaft housing includes a receiving portion configured to receive the second motor and the body rotating motor, an upper side of the rotating shaft housing is opened at a predetermined portion so that the rotating shaft is lifted up and down, and saw teeth are formed at a lower end of the rotating shaft housing along an inner circumferential surface.

15. The inspection apparatus according to claim 13, wherein the body rotating motor includes a gear which is operated together with saw teeth, which are formed at the rotating shaft housing, through an inner gear structure.

16. The inspection apparatus according to claim 1, wherein the expanding cylinder is formed with a plurality of fingers, and the expanding cylinder is fixed to and released from the penetration pipe by expanding and contracting the fingers by working fluid or an expanding portion pipe.

17. The inspection apparatus of claim 1, wherein the outer diameter support gripper includes, a gripper frame having a 'U' shaped structure formed at an end of the rotating shaft, cylinders formed at both ends of the gripper frame, and a gripper block formed at each of the cylinders and including a groove which is formed at one side of the gripper block and has a curvature corresponding to a curvature of an outer diameter of the penetration pipe.

18. The inspection apparatus of claim 1, wherein the cone support rotating gripper includes a circular base frame formed at an end of the rotating shaft, a rotating plate provided at an upper side of the base frame and rotatably coupled to the base frame about a rotating axis which is a center point of the base frame, and a rotating plate rotating motor provided at the base frame and configured to rotate the rotating plate by being operated together with the rotating plate.

19. The inspection apparatus of claim 18, wherein the base frame includes a circular frame having cone guide unit fixing protrusions which is coupled with a cone guide unit, and a plurality of wing portions protruding along an outer circumferential surface of the circular frame at equal intervals.

20. The inspection apparatus of claim 19, wherein the wing portion includes a cone support finger movably coupled to an end of the wing portion.

21. The inspection apparatus of claim 20, wherein one end of the cone support finger, which is in contact with a cone, is bent, and the other end of the cone support finger is connected to a guide pin, so that the cone support finger is moved at an end of the wing portion in accordance with a movement of the guide pin.

22. The inspection apparatus of claim 18, wherein the rotating plate includes a first guide hole in which a cone guide unit fixing protrusion formed at the base frame is inserted to be guided, a second guide hole in which a guide pin formed at the base frame is inserted to be guided, and saw teeth formed at an outer circumferential surface.

23. The inspection apparatus of claim 22, wherein the rotating plate moves a position of the guide pin inserted into the second guide hole by a rotation of the rotating plate.

24. The inspection apparatus of claim 18, wherein the rotating plate rotating motor includes a gear which is formed at any one of wing portions of the base frame and is able to be operated with saw teeth formed at the rotating plate.

25. The inspection apparatus according to claim 1, further comprising:
a distance and position measurement sensor.

26. The inspection apparatus according to claim 1, further comprising:
a camera provided at the body.

27. The inspection apparatus of claim 1, wherein the body is formed with a plurality of frames having a jig structure and has a guide rail unit formed along a longitudinal direction of a horizontal frame.

28. The inspection apparatus of claim 1, wherein the probe module further includes a probe rotating motor configured to rotate the probe, a probe fixing frame configured to which the probe is fixed, a probe lifting unit formed at the probe fixing frame and configured to lift up and down the probe, and a probe moving unit formed at the probe fixing frame and configured to move a position of the probe by being moved along the guide rail unit.

29. The inspection apparatus of claim 28, wherein the probe lifting unit includes a motor or a cylinder to lift up and down the probe.

30. The inspection apparatus of claim 28, wherein the probe moving unit includes a probe moving motor including any one of a gear, a ball screw, and square threads to be operated together with the guide rail unit.

31. The inspection apparatus of claim 1, wherein the fixing module further includes the fixing shaft fixing frame, a fixing shaft having a screw structure, which is coupled to the fixing shaft fixing frame and has a cone support gripper and a cone guide unit, a fixing shaft lifting unit configured to lifting up and down the fixing shaft, and a fixing shaft moving unit formed at the fixing shaft fixing frame and configured to move a position of the fixing shaft by being moved along the guide rail unit.

32. The inspection apparatus of claim 1, wherein the fixing shaft lifting unit includes a motor including any one of a screw jack, a ball screw, and square threads which are operated together with the fixing shaft, and operating the screw jack, the ball screw, or the square threads.

33. The inspection apparatus of claim 1, wherein the fixing shaft moving unit includes a fixing shaft moving motor including any one of a gear, a ball screw, and square threads to be operated together with the guide rail unit.

34. The inspection apparatus of claim 1, wherein the rotating module includes a rotating shaft fixing frame fixed to the body, a rotating shaft haying a screw structure, which is coupled to the rotating shaft fixing frame and has a cone support gripper and a cone guide unit, a rotating shaft lifting unit connected to the rotating shaft to lift up and down the rotating shaft, and a body rotating unit configured to rotate the body about the rotating shaft.

35. The inspection apparatus of claim 34, wherein the rotating shaft fixing frame includes a pair of horizontal plates fixed to the horizontal frame of the body, and a support pipe configured to connect the horizontal plates.

36. The inspection apparatus of claim 34, wherein the rotating shaft lifting unit includes a motor including any one of a screw jack, a ball screw, and square threads which are operated together with the rotating shaft, and operating the screw jack, the ball screw, or the square threads.

37. The inspection apparatus of claim 1, wherein the cone support gripper includes, a cone support frame penetratingly coupled to the fixing shaft, a cone support fingers hingedly coupled to both ends of the cone support frame, and a finger operating unit configured to operate the cone support finger.

38. The inspection apparatus of claim 37, wherein he cone support frame includes a pair of blocks connected to the cone support finger, and a screw bar configured to connect the blocks.

39. The inspection apparatus of claim 37, wherein the cone support finger includes a first finger frame having an outer diameter support plate which is formed at an end and has the same curvature as an outer diameter of the penetration pipe, and a second finger frame formed to be separated from the first finger frame to support the cone.

40. The inspection apparatus of claim 37, wherein the finger operating unit includes a motor formed at the cone support frame to operate a screw bar.

41. The inspection apparatus of claim 1, further comprising: a distance and position measurement sensor.

42. The inspection apparatus of claim 1, further comprising: a camera provided at the body.

* * * * *